(12) United States Patent
Khuc et al.

(10) Patent No.: US 6,459,788 B1
(45) Date of Patent: Oct. 1, 2002

(54) CALL CENTER RESOURCE PROCESSOR

(75) Inventors: Minh Duy Khuc, Overland Park, KS (US); Carl Milton Coppage, Harrisonville, MO (US); Bryce Alan Jones, Overland Park, KS (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

(21) Appl. No.: 09/299,391

(22) Filed: Apr. 27, 1999

(51) Int. Cl.[7] ............................................... H04M 3/00
(52) U.S. Cl. .................................. 379/265.09; 370/352
(58) Field of Search ..................... 379/265.09, 266.1, 379/900; 370/352

(56) References Cited

U.S. PATENT DOCUMENTS

| | | | |
|---|---|---|---|
| 5,206,903 A | | 4/1993 | Kohler et al. |
| 5,504,739 A | * | 4/1996 | Chopping ................... 370/372 |
| 5,592,541 A | | 1/1997 | Fleischer, III et al. |
| 5,628,025 A | * | 5/1997 | Chung et al. ............. 712/22 X |
| 5,675,635 A | | 10/1997 | Vos et al. |
| 5,828,740 A | | 10/1998 | Khuc et al. |
| 5,870,552 A | * | 2/1999 | Dozier et al. ............... 109/219 |
| 6,262,976 B1 | * | 7/2001 | McNamara ................. 370/351 |

* cited by examiner

*Primary Examiner*—Creighton Smith
(74) *Attorney, Agent, or Firm*—Harley R. Ball; Steven J. Funk; Kevin D. Robb

(57) ABSTRACT

The invention provides a call processing system to handle calls to a call center by obtaining absolute address for a call center resource from a call center resource processor prior to directing the call to the call center resource. The invention includes a call center resource processor that receives an address query from a communications system for an absolute address of a call center resource. The call center resource processor processes the address query to identify the absolute address. After identifying the absolute address, the call center resource processor generates an address response with the absolute address for the call center resource. The call center resource processor transmits the address response with the absolute address from the call center resource processor for the communications system to route the call using the absolute address. At the call center resource, no translation of the call is needed to direct the call to the call's final destination, an agent, interactive voice response, or voice response unit. Therefore, complex routing equipment at the call center resource can be eliminated. Because the absolute address is identified at the call center resource processor, the invention may also transmit service data over the same communications equipment as the call from the network element system to the call center resource. Separate communications equipment at the call center resource for service data can be eliminated.

84 Claims, 25 Drawing Sheets

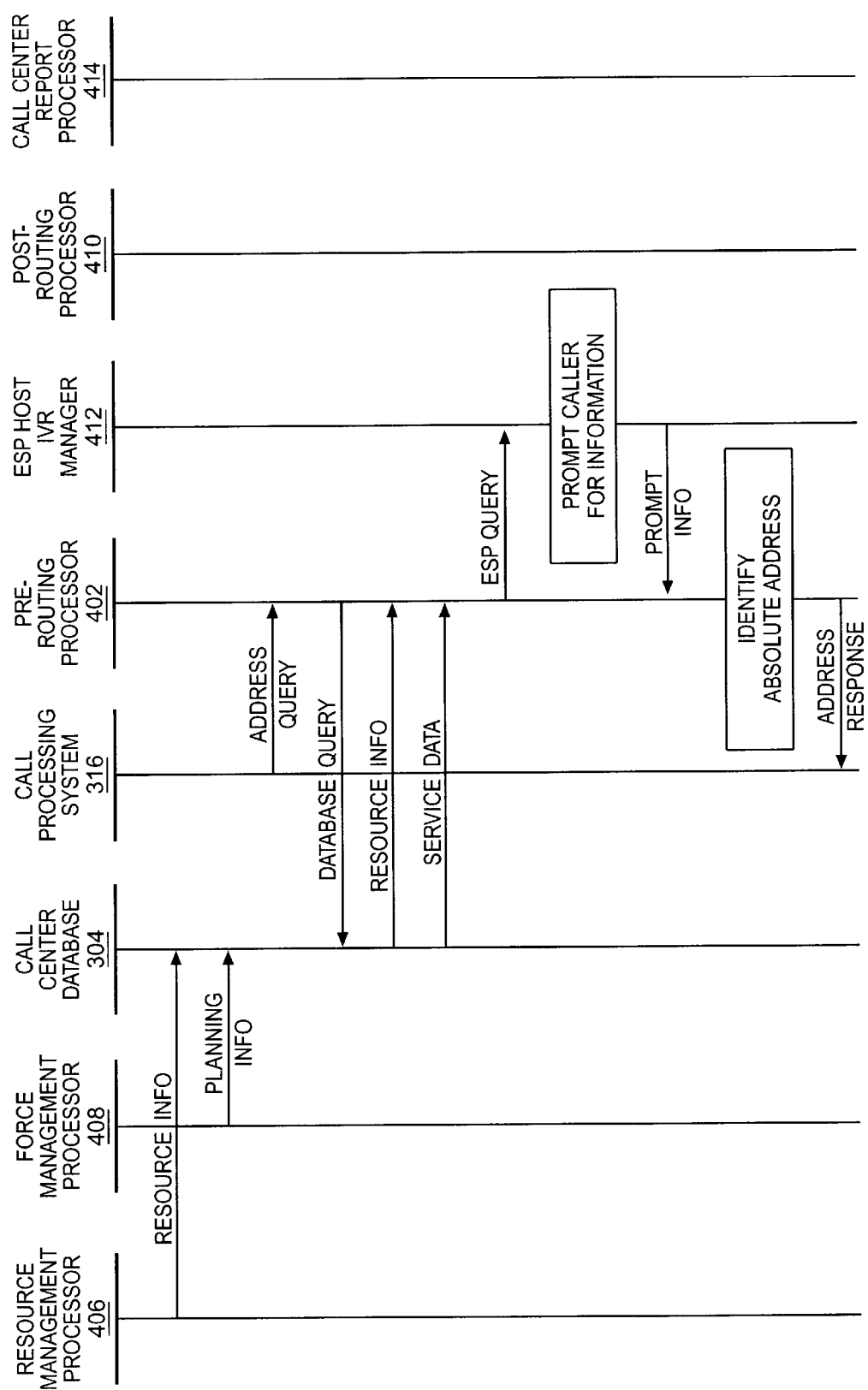

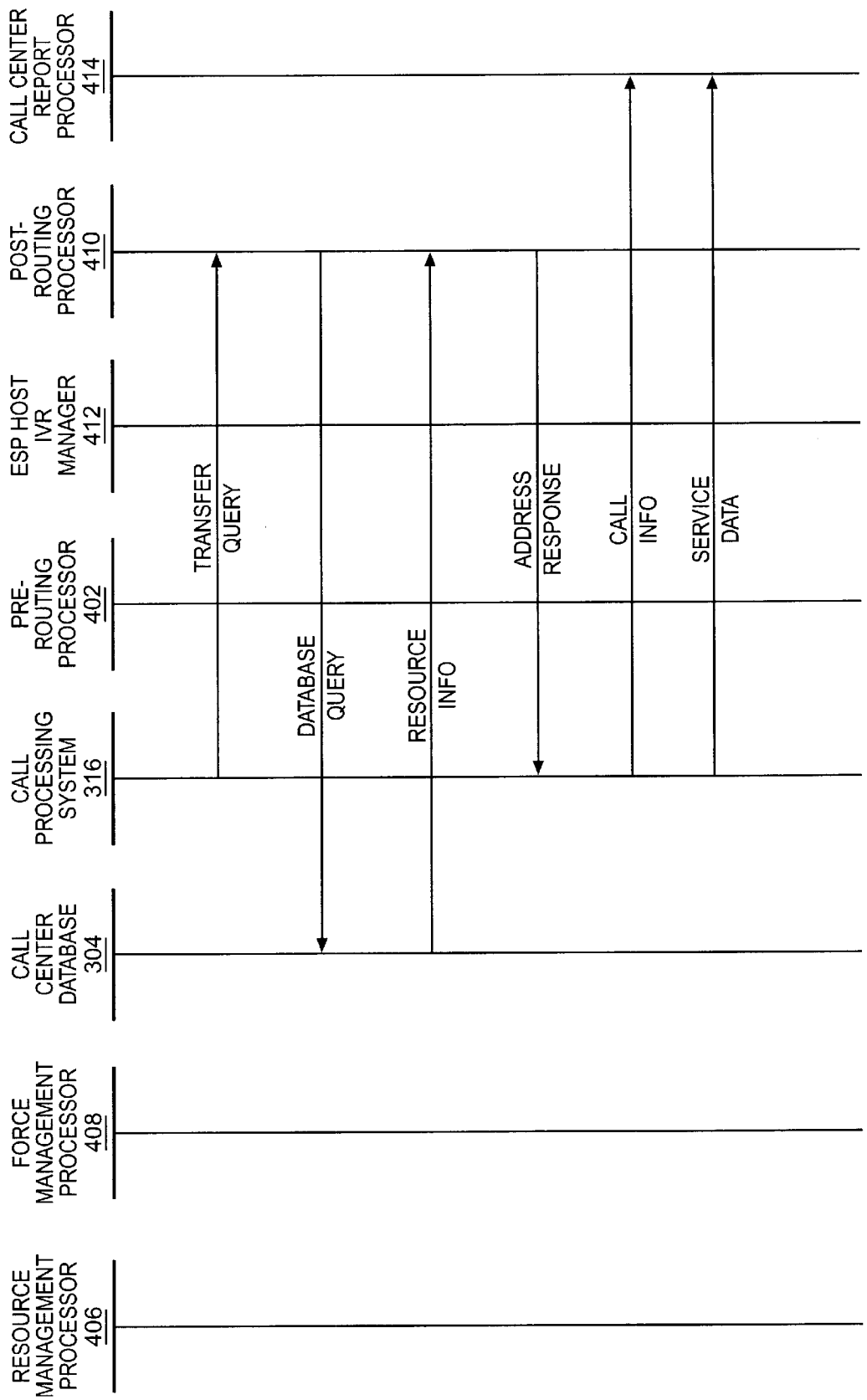

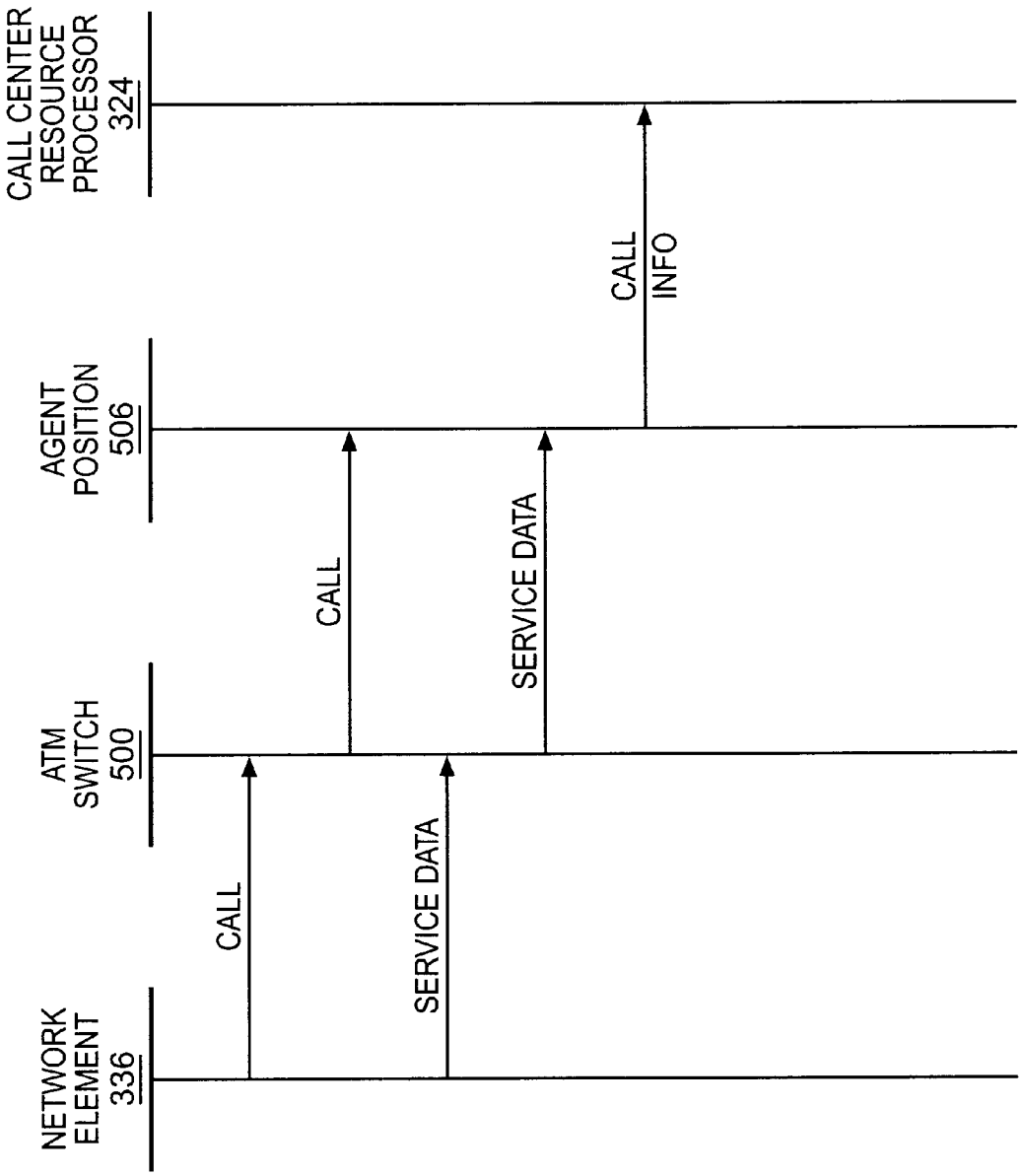

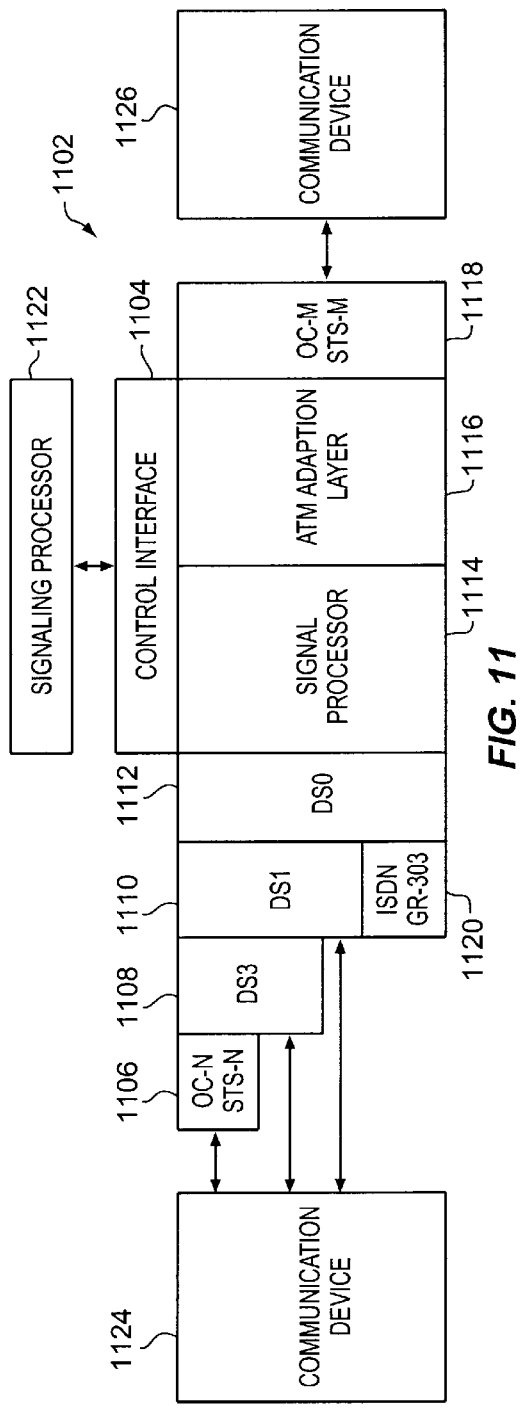
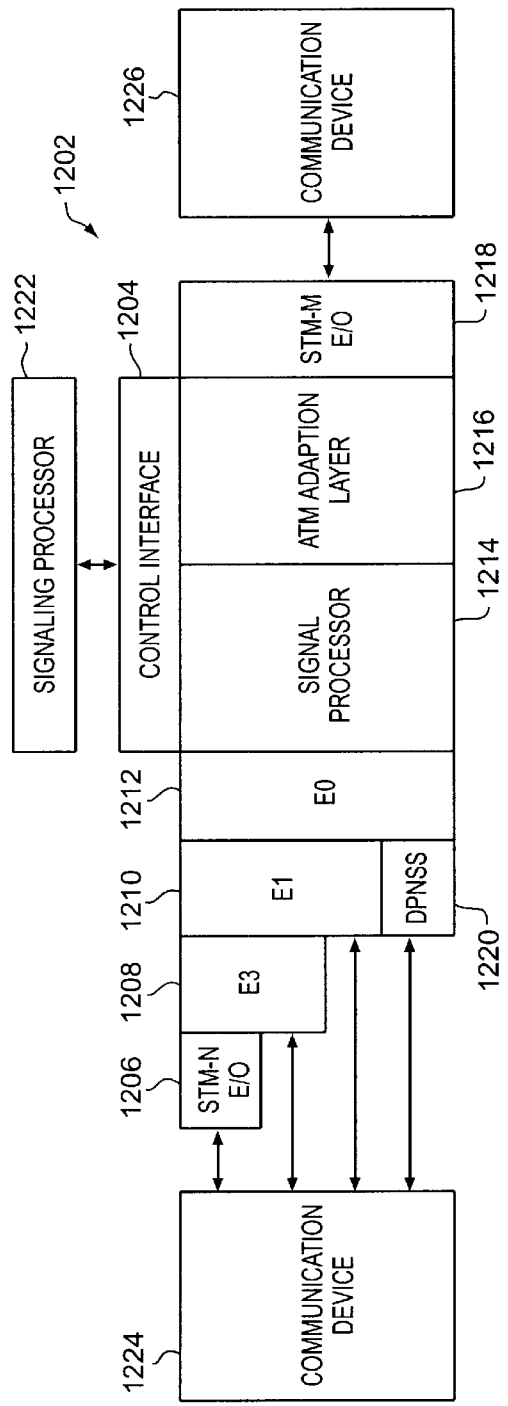
FIG. 11
FIG. 12

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 18

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 19

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 20A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 20B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

FIG. 20C

| CARRIER LABEL | CARRIER ID | CARRIER SELECTION | NEXT FUNCTION | NEXT LABEL |
|---|---|---|---|---|
| | | | | |
| | | | | |

FIG. 21

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |
| | | | | | | |

FIG. 22

| OLI LABEL | ORIGINATION LINE INFORMATION | NEXT FUNCTION | NEXT LABEL |
|---|---|---|---|
| | | | |
| | | | |

FIG. 23

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |
| | | | | | | | | | |

FIG. 24

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |
| | | | | | | |

FIG. 25

| CALLED NUMBER LABEL | CALLED NUMBER | | NEXT FUNCTION | NEXT LABEL |
|---|---|---|---|---|
| | NATURE OF ADDRESS | DIGITS FROM | DIGITS TO | | |
| | | | | | |

FIG. 26

| DAY OF YEAR LABEL | DATE | NEXT FUNCTION | NEXT LABEL |
|---|---|---|---|
| | | | |

FIG. 27

| DAY OF WEEK | DAY FROM | DAY TO | NEXT FUNCTION | NEXT LABEL |
|---|---|---|---|---|
| | | | | |

FIG. 28

| TIME OF DAY LABEL | TIME FROM | TIME TO | NEXT FUNCTION | NEXT LABEL |
|---|---|---|---|---|
| | | | | |

FIG. 29

| TIME ZONE LABEL | UTC OFFSET | DAYLIGHT SAVINGS |
|---|---|---|
| | | |

FIG. 30

| ROUTING LABEL | ROUTE NUMBER | NEXT FUNCTION | NEXT LABEL | SIGNAL ROUTE LABEL |
|---|---|---|---|---|
|  |  |  |  |  |

FIG. 31

| ORIGINATING TRUNK COS LABEL | TERMINATING TRUNK COS LABEL | NEXT FUNCTION | NEXT LABEL |
|---|---|---|---|
|  |  |  |  |

FIG. 32

| TREATMENT LABEL | ERROR/CAUSE LABEL | NEXT FUNCTION | NEXT LABEL |
|---|---|---|---|
|  |  |  |  |

FIG. 33

| OUTGOING RELEASE LABEL | LOCATION | OUTGOING CAUSE VALUE CODING STANDARD | CAUSE VALUE |
|---|---|---|---|
|  |  |  |  |

FIG. 34

| PERCENT LABEL | CONTROL PERCENTAGE | CONTROL NEXT FUNCTION | CONTROL NEXT LABEL | PASSED NEXT FUNCTION | PASSED NEXT LABEL |
|---|---|---|---|---|---|
|  |  |  |  |  |  |

FIG. 35

| CALL RATE LABEL | CALL RATE | CONTROL | | PASSED | |
|---|---|---|---|---|---|
| | | NEXT FUNCTION | NEXT LABEL | NEXT FUNCTION | NEXT LABEL |
| | | | | | |
| | | | | | |

FIG. 36

| DATABASE SERVICES LABEL | SERVICE TYPE | SCCP LABEL | TCAP LABEL | NEXT FUNCTION | NEXT LABEL |
|---|---|---|---|---|---|
| | | | | | |
| | | | | | |

FIG. 37

| SCCP LABEL | MESSAGE TYPE | PROTOCOL CLASS | MESSAGE HANDLING | HOP COUNTER | SEGMENTATION |
|---|---|---|---|---|---|
| | | | | | |
| | | | | | |

FIG. 38A

| ISNI TYPE | ISNI | | MARK INDICATOR | LABEL |
|---|---|---|---|---|
| | ROUTE INDICATOR | | | |
| | | | | |
| | | | | |

FIG. 38B

| SSN | ADDRESS INDICATOR | | | CALLED PARTY ADDRESS | | | GLOBAL TITLE | | | |
|---|---|---|---|---|---|---|---|---|---|---|
| | POINT CODE | GLOBAL TITLE INDICATOR | ROUTING INDICATOR | NATIONAL/ INTERNATIONAL | SUB SYSTEM NUMBER | PRINT CODE NUMBER | TRANSLATION TYPE | ENCODE SCHEME | NUMBER PLAN | ADDRESS TYPE |
| | | | | | | | | | | |
| | | | | | | | | | | |

| SSN | ADDRESS INDICATOR | | | | CALLING PARTY ADDRESS | | GLOBAL TITLE | | |
|---|---|---|---|---|---|---|---|---|---|
| | POINT CODE | GLOBAL TITLE INDICATOR | ROUTING INDICATOR | NATIONAL/ INTERNATIONAL | SUB SYSTEM NUMBER | PRINT CODE NUMBER | TRANSLATION TYPE | ENCODE SCHEME | NUMBER PLAN | ADDRESS TYPE |
| | | | | | | | | | | |

FIG. 39

| ISNI LABEL | NETWORK 1 | NETWORK 2 | NETWORK 3 | ... | NETWORK 16 |
|---|---|---|---|---|---|
| | | | | | |

FIG. 40

| TCAP LABEL | TCAP TYPE | TAG CLASS | PACKAGE TYPE | COMPONENT TYPE | MESSAGE TYPE |
|---|---|---|---|---|---|
| | | | | | |

FIG. 41

| ECHO CANCELLER LABEL | ECHO CANCELLER TYPE | RS-232 ADDRESS | MODULE |
|---|---|---|---|
| | | | |

FIG. 42

| IWU LABEL | IWU ID | IP SOCKET 1 | IP SOCKET 2 | IP SOCKET 3 | IP SOCKET 4 |
|---|---|---|---|---|---|
| | | | | | |

FIG. 43

| CAM INTERFACE LABEL | CAM LABEL | LOGICAL INTERFACE |
|---|---|---|
| | | |

| CAM LABEL | CAM TYPE | CAM ADDRESS |
|---|---|---|
|  |  |  |

FIG. 44

| OFFICE CLLI NAME | SITE NODE ID | ORIGINATION ID | SOFTWARE ID | CALL PROCESSOR ID |
|---|---|---|---|---|
|  |  |  |  |  |

FIG. 45A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
|  |  |  |  |  |  |  |

FIG. 45B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
|  |  |  |  |  |  |  |

FIG. 45C

| MAX HOP COUNTS | MAX TABLE LOOKUPS |
|---|---|
|  |  |

FIG. 45D

| AIN EVENT PARAMETERS LABEL | MESSAGE NAME #1 | MESSAGE NAME # ... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

*FIG. 46A*

| AIN EVENT PARAMETERS LABEL | MESSAGE NAME #1 | MESSAGE NAME # ... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

*FIG. 46B*

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

*FIG. 47*

CALL CENTER RESOURCE PROCESSOR

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of call processing systems, and in particular, to a system that routes calls to a call center.

2. Description of the Prior Art

Call processing is a key component to companies looking to compete in rapidly growing global markets. Call processing is essential to companies for entering sales orders, furnishing product or service information, and providing customer service. The increasing number of calls handled by a call center and the need for expanding service to new geographic regions introduce new demands to call center processing. In order to meet these demands, companies are increasing their number of call centers to provide better customer service such as extended hours of operations and service agents fluent in the caller's native language. One call center could provide for continuous operating hours and a diverse array of foreign language agents. However, constraints such as graveyard shifts and lack of ethnic diversity in a certain geographic region make a one call center solution difficult. Other solutions such as different "800" numbers based on language or hours of operations are confusing to the consumer and thus impractical. Greater number of call centers can also improve customer service by reducing queuing times through diverting calls to less occupied call centers.

A flexible and robust call processing solution with an expansive network of call centers is needed. An important factor in providing an operable solution is to minimize costs. Simplifying each call center down to the service agent assists in reducing costs and implementation times. Less implementation of call processing equipment can further reduce unneeded costs. In the event that a call center becomes impaired, the call processing solution should be flexible enough to route calls to alternate call centers. Implementation of new call processing schemes should be uniform and rapid across the network of call centers. Companies also require usage and call information to monitor call centers usage and improve future call processing designs. Ultimately, companies need greater freedom to employ their own provisioning, managing, and billing tools for their call centers.

One current system uses a telephone circuit switch to receive calls and signaling into a network. The telephone circuit switch processes the called number to generate and transmit a first query to a Service Control Point (SCP). The SCP processes the first query to generate a second query to a routing processor at a call center. The routing processor at the call center responds to the SCP with routing information, and the SCP responds to the telephone circuit switch with the routing information. The telephone circuit switch then extends the call to another telephone circuit switch connected to the call center based on the routing information. This other telephone circuit switch then transfers the call to the call center over a dedicated Time Division Multiplexing (TDM) line, such as an Integrated Services Digital Network (ISDN) connection. This transfer includes a transfer of the called number. Routing equipment at the call center must process the called number to internally route the call to the destination within the call center. This system is deficient because it forces the routing equipment at the call center to handle dialed number processing. It also does not allow the efficient utilization of packet-based transport technologies.

Another current system uses a telephone circuit switch to receive calls and signaling into a network. The telephone circuit switch processes the called number to generate and transmit a first query to a Service Control Point (SCP). The SCP responds to the telephone circuit switch with the routing information. The telephone circuit switch then extends the call to a service platform using Extended Superframe (ESF) or ISDN connections. The service platform processes the called number to generate a second query to a routing processor at a call center. The routing processor at the call center responds to the service platform with routing information. The service platform then extends the call to another telephone circuit switch connected to the call center based on the routing information. This other telephone circuit switch then transfers the call to the call center over a dedicated TDM line, such as an ESF connection or an ISDN connection. This transfer includes a transfer of the called number. Routing equipment at the call center must process the called number to internally route the call to the destination within the call center. This system is deficient because it forces the routing equipment at the call center to handle dialed number processing. It also does not allow the efficient utilization of packet-based transport technologies.

SUMMARY OF THE INVENTION

The invention solves the above problem by providing integrated broadband call processing that uses a call center resource processor to determine how to route calls to the call center. The invention includes a call center resource processor that receives an address query from a communications system for the absolute address of a call center resource. The "absolute" address is a hardware address of a device used to initially answer the call at the call center. The absolute address is contained in packets for the call. Some examples of absolute addresses are a port identifier, Media Access Control (MAC) layer address, and Asynchronous Transfer Mode (ATM) address. The absolute address does not require translation at the call center to identify the answering devices. In contrast, telephone numbers require translation to identify a terminating point or telephone. The call center resource processor processes the address query to identify the absolute address for the call center resource. After identifying the absolute address, the call center resource processor generates an address response with the absolute address for the call center resource. The call center resource processor transmits the address response with the absolute address from the call center resource processor for the communications system to route the call using the absolute address. In one embodiment, the invention identifies the call center resource by which call center resource is available and capable to handle the call.

The invention allows the call center and communications network to efficiently utilize packet-based transport technologies. This results in the elimination of complex routing equipment at the call center site. Routing can now be passive at the call center resource level since the call can be routed directly to the service agent or voice response unit based on the absolute address. Any address translation such as dialed number processing at the call center resource level can be removed.

Another advantage from utilizing packet-based transport technologies is the reduction of routing equipment for separate data lines for service data. Service data is data associated with the call or data derived from the call. Some examples of service data include caller name and address, service scripts, or other screen pop information. In a screen pop operation, service data such as customer profile and product and service information pops up on the agent's computer when the agent receives the incoming call. Because the call processing system already has the absolute address for the call, the invention can now transmit the service data in data packets using the absolute address over the same line as the call. Therefore, separate, dedicated routing equipment for service data is eliminated at the call center resource level.

The invention allows telephone companies to provide a flexible and robust call processing system to companies requiring call center services. Removing the call processing at the call center site level and centralizing the call processing at a call center resource processing level satisfies many of the call center companies' needs. A centralized call center resource processor can monitor call center for overuse and redirect calls to underutilized call centers. The invention provides one phone number access to multiple call centers with increased hours of operations and foreign language agents. Centralization to a call center resource processor will also reduce implementation times of new call center processing designs by eliminating implementations at each call center site. The centralized call center resource processor provides greater flexibility to companies to configure their call processing based on their needs.

The invention may also provide absolute, real-time usage information for the call to the call center resource processor. The call center resource processor can record service data and call information, while also monitoring call center resource availability and bottlenecks. This information can then be used as a basis for new center processing designs and decisions regarding usage of call center processing.

BRIEF DESCRIPTION OF THE DRAWINGS

FIG. 7A is a message sequence chart for a call center resource processor of a distributed system in an example of the invention.

FIG. 7B is a continuation message sequence chart for a call center resource processor of a distributed system in an example of the invention.

FIG. 8 is a message sequence chart for a call center resource of a distributed system in an example of the invention.

FIG. 11 is a functional diagram of an asynchronous transfer mode interworking unit for use with a synchronous optical network system in accordance with the present invention.

FIG. 12 is a functional diagram of an asynchronous transfer mode interworking unit for use with a synchronous digital hierarchy system in accordance with the present invention.

FIG. 18 is a table diagram of a time division multiplex trunk circuit table used in the signaling processor.

FIG. 19 is a table diagram of an asynchronous transfer mode trunk circuit table used in the signaling processor.

FIG. 20A is a table diagram of a trunk group table used in the signaling processor.

FIG. 20B is a continuation table diagram of the trunk group table.

FIG. 20C is a table diagram of a continuation of the trunk group table.

FIG. 21 is a table diagram of a carrier table used in the signaling processor.

FIG. 22 is a table diagram of an exception table used in the signaling processor.

FIG. 23 is a table diagram of an originating line information table used in the signaling processor.

FIG. 24 is a table diagram of an automated number identification table used in the signaling processor.

FIG. 25 is a table diagram of a called number screening table used in the signaling processor.

FIG. 26 is a table diagram of a called number table used in the signaling processor.

FIG. 27 is a table diagram of a day of year table used in the signaling processor.

FIG. 28 is a table diagram of a day of week table used in the signaling processor.

FIG. 29 is a table diagram of a time of day table used in the signaling processor.

FIG. 30 is a table diagram of a time zone table used in the signaling processor.

FIG. 31 is a table diagram of a routing table used in the signaling processor.

FIG. 32 is a table diagram of a trunk group class of service table used in the signaling processor.

FIG. 33 is a table diagram of a treatment table used in the signaling processor.

FIG. 34 is a table diagram of an outgoing release table used in the signaling processor.

FIG. 35 is a table diagram of a percent control table used in the signaling processor.

FIG. 36 is a table diagram of a call rate table used in the signaling processor.

FIG. 37 is a table diagram of a database services table used in the signaling processor.

FIG. 38A is a table diagram of a signaling connection control part table used in the signaling processor.

FIG. 38B is a continuation table diagram of the signaling connection control part table.

FIG. 38C is a continuation table diagram of the signaling connection control part table.

FIG. 38D is a continuation table diagram of the signaling connection control part table.

FIG. 39 is a table diagram of an intermediate signaling network identification table used in the signaling processor.

FIG. 40 is a table diagram of a transaction capabilities application part table used in the signaling processor.

FIG. 41 is a table diagram of a external echo canceller table used in the signaling processor.

FIG. 42 is a table diagram of an interworking unit used in the signaling processor.

FIG. 43 is a table diagram of a controllable asynchronous transfer mode matrix interface table used in the signaling processor.

FIG. 44 is a table diagram of a controllable asynchronous transfer mode matrix table used in the signaling processor.

FIG. 45A is a table diagram of a site office table used in the signaling processor.

FIG. 45B is a continuation table diagram of the site office table.

FIG. 45C is a continuation table diagram of the site office table.

FIG. 45D is a continuation table diagram of the site office table.

FIG. 46A is a table diagram of an advanced intelligent network event parameters table used in the signaling processor.

FIG. 46B is a continuation table diagram of the advanced intelligent network event parameters table.

FIG. 47 is a table diagram of a message mapping table used in the signaling processor.

DETAILED DESCRIPTION OF THE PREFERRED EMBODIMENT

Figure 1:
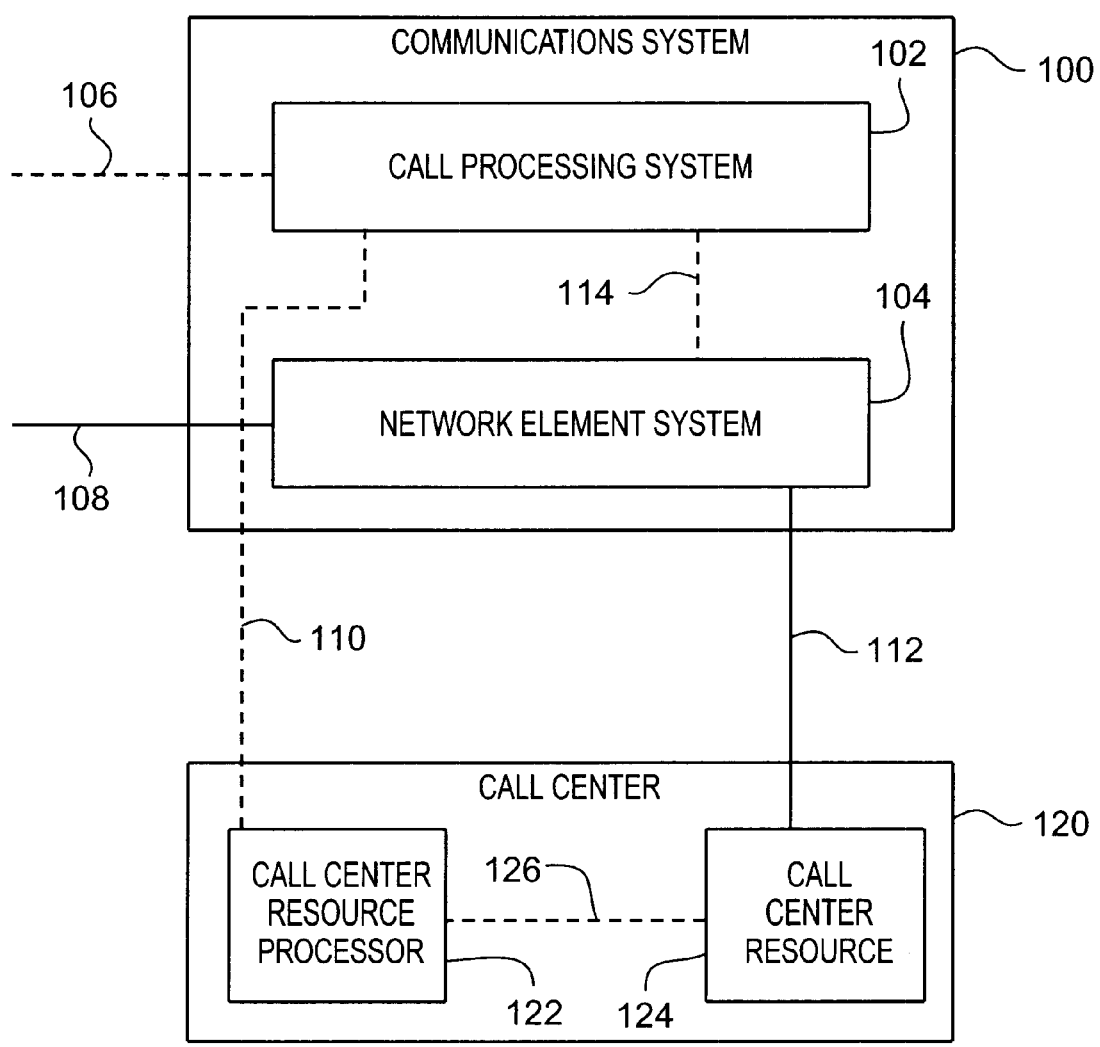
FIG. 1 is a system level block diagram of an example of the invention.
Figure 2:
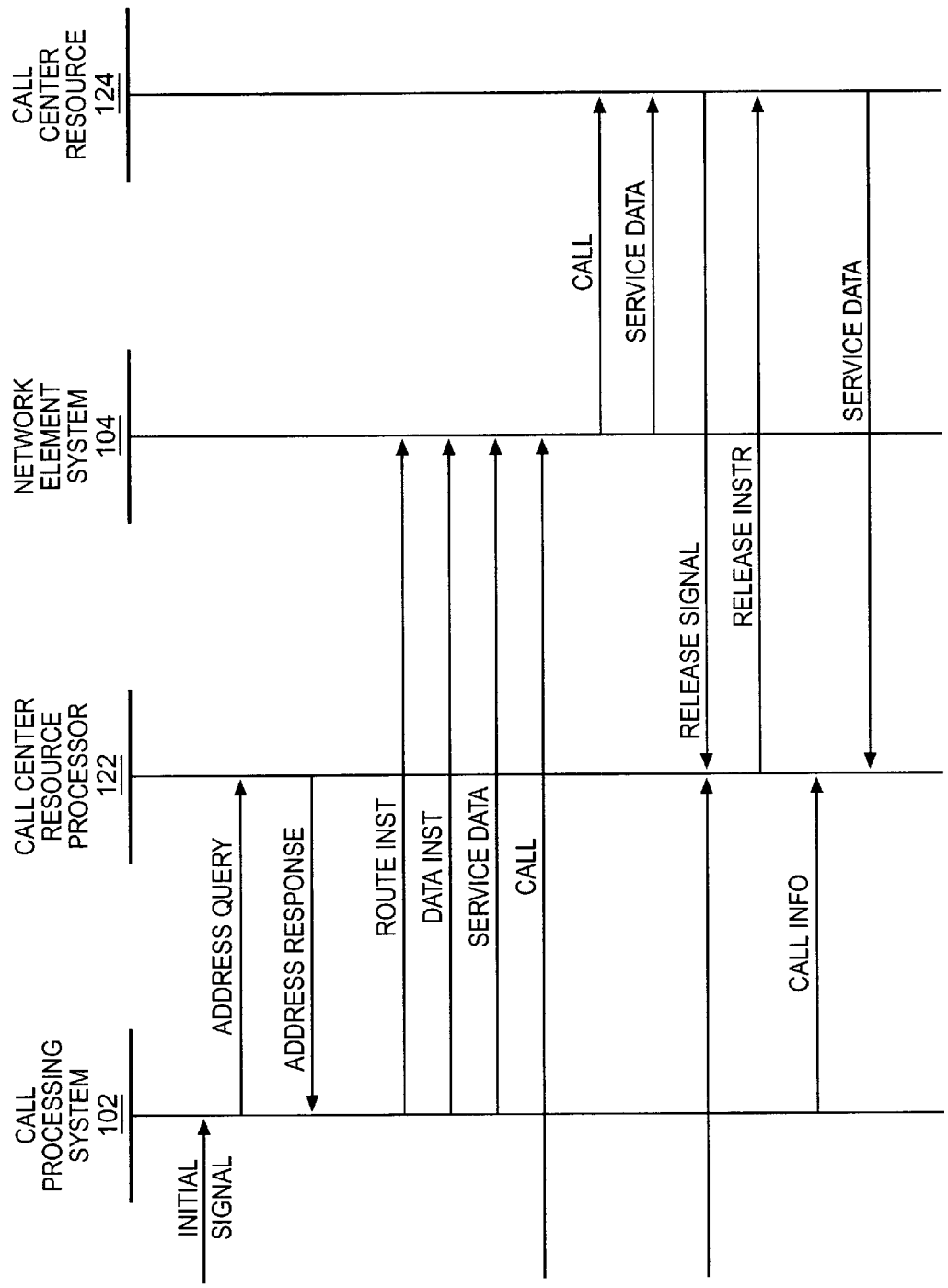
FIG. 2 is a message sequence chart of an example of the invention.

System Configuration and Operation—FIGS. 1–2

An advantage of using an absolute address to transfer a call from a communications network to a call center resource is that it allows the call center and communications network to handle the call center resources in a real time, precise fashion. This results in the elimination of complex, dedicated routing equipment at the call center, since the call can be routed within the call center using the absolute address that is in the call packets when the call center receives them. No longer will duplication of call processing equipment be needed at every call center. Instead, call processing equipment can be centralized at the call center resource processor.

An advantage of obtaining an absolute address from a call center resource processor is that it provides greater flexibility for call center operators to employ their own process for handling incoming calls. Centralization of call center processing can lead to a more dynamic call center architecture and reduction of implementation times of new design features of call center processing. Call center operators can freely configure their global call center network to improve customer service by reducing call queuing time and optimizing use of call centers.

Another advantage is service data such as customer data and product and service information can be routed directly to the call center resource using the absolute address. The service data is transmitted to the call center resource over the same communication equipment as the call is transmitted. Thus, dedicated communication equipment for providing service data to the call center resource are eliminated.

FIG. 1 depicts a communications system 100 coupled to a call center 120 by a control link 110 and a call link 112. The communications system 100 is comprised of a call processing system 102 and a network element system 104 connected by a control link 114. A signal link 106 connects to the call processing system 102. A call link 108 connects with the network element system 104. The call center 120 is comprised of a call center resource processor 122 and a call center resource 124 connected by a control link 126. The control link 110 connects call processing system 102 and call center resource processor 122. The call link 112 connects the network element system 104 and the call center resource 124.

The call processing system 102 could be any computer processing platform that: 1) receives and processes the signal for a call to select a call center resource processor 122, 2) generates and transmits an address query for the call center resource processor 122, 3) receives an address response from the call center resource processor 122 that includes an absolute address for the call, and 4) processes the address response to generate and transmit a route instruction to cause the network element system 104 to route the call to the call center resource 124 using the absolute address. The call processing system 102 may also receive service data from the call center resource processor 122 and transmit the service data to the network element system 104 for delivery to the call center resource 124 using the absolute address.

The network element system 104 represents any communications device or combination of devices that: 1) receives the call, 2) receives the route instruction containing the absolute address for the call, and 3) transfers packets containing the call to the call center resource 124 using the absolute address obtained. One embodiment of the communications system 100 is further described below in FIGS. 9–47.

The call center resource processor 122 could be any computer processing platform that: 1) receives the address query for the absolute address, 2) processes the address query to identify the absolute address for a call destination within the call center resource 120, and 3) generates and transmits the address response with the absolute address. The call center resource processor 122 may also generate and transmit the service data to the call processing system 102.

The call center 120 is a call destination that is typically external to the communications network 100 and handles high-call volumes. The call center includes many call center resources 124 that answer calls and interact with the caller to provide services such as order taking or customer service. Call centers and call center resources are well known.

To transfer the call to the call center 120, the network element system 104 transfers packets containing both the absolute address and the call to the call center 120. The call center 120 uses the absolute address to route these packets to a call destination within the call center resource 124. It should be noted that the call center 120 does not need to translate the absolute address in order to route the call packets to the destination. Phone numbers and internet addresses need some translation to hardware address such as a MAC layer address. The "absolute" address is a hardware address of a device used to initially answer the call at the call center 120. Some examples of absolute addresses are a port identifier, MAC-layer address, ATM address, or call processing thread unique to the person or voice response unit (VRU) receiving the call. The absolute address is contained in call packets. An advantage to identifying the absolute address is no translation is needed at the call center resource 124.

The term "processor" could mean a single processing device or a plurality of inter-operational processing devices. Some examples of processors are computers, microprocessor chips, integrated circuits, and logic circuitry. A particular reference number in one figure refers to the same element in all of the other figures.

FIG. 2 depicts a message sequence chart for the call processing system 102, the call center resource processor 122, the network element system 104, and the call center resource 124 in accordance with the invention. The initial signal comes through the signal link 106 to the call processing system 102. The call processing system 102 processes the initial signal to select the call center resource processor 122 and generates the address query. In alternative embodiments of the invention, the call processing system's 102 processing of the initial signal to select the call center resource processor 122 can be based upon the caller number, the called number, or caller entered digits such as a personal identification number or an account code. The call processing system 102 transmits the address query through the control link 110 to the call center resource processor 122. Upon receipt of the address query, the call center resource processor 122 processes the address query to identify the absolute address for the call center resource 124. The call center resource processor 122 also generates the service data. Service data is data associated with the call or data derived from the call. Some examples of service data are Automatic Number Identification (ANI), customer information, items previously ordered by the caller, web pages containing data, and prompting information. The service data could be used to pop up a screen with this information at the agent's computer. The call center resource processor 122 replies with an address response including the absolute address and the service data back through the control link 110 to the call processing system 102.

The call processing system 102 processes the address response to generate a route instruction to cause the network element system 104 to route the call to a call center resource 124 in call packets containing the absolute address. The call processing system 102 then transmits the route instruction including the absolute address through the control link 114 to the network element system 104. The call processing system 102 transmits a data instruction to cause the network element system 104 to route the service data to the call center resource 124 in data packets containing the absolute address to the network element system 104 through the control link 114. The call processing system 102 also transmits the service data to the network element system 104 through the control link 114. The network element system 104 receives the call over the call link 108. In response to the receiving the route instruction, the network element system 104 routes the call to the call center resource 124 through the call link 112 using call packets that contain the absolute address from the route instruction. The network element system 104 also transmits the service data to the call center resource 124 through the call link 112.

Once the call terminates, a release signal is received into the call processing system 102 through one of the links 106, 110, or 114. The call processing system 102 transmits an instruction to terminate the call to the network element system 104 through the control link 114. In response to a call release, the call processing system 102 generates call information. Call information concerning the call is then sent from the call processing system 102 to the call center resource processor 122 through the control link 110. Call information is information related to the call's operation. Some examples of call information are caller number, dialed number, absolute address, time of call, call duration, system usage time, number of resources used, origin of call, and identification of call center receiving call. Call center resource 124 also transmits service data via the control link 126 to the call center resource processor 122.

Broadband Distributed Call Center Communication System—FIGS. 3–8

FIGS. 3–8 disclose a distributed configuration of the invention, but the invention is not restricted to the configuration provided below. Those skilled in the art will appreciate numerous variations in routing system configuration and operation that are within the scope of the invention. Those skilled in the art will also appreciate how the principles illustrated in this example can be used in other examples of the invention.

Figure 3:
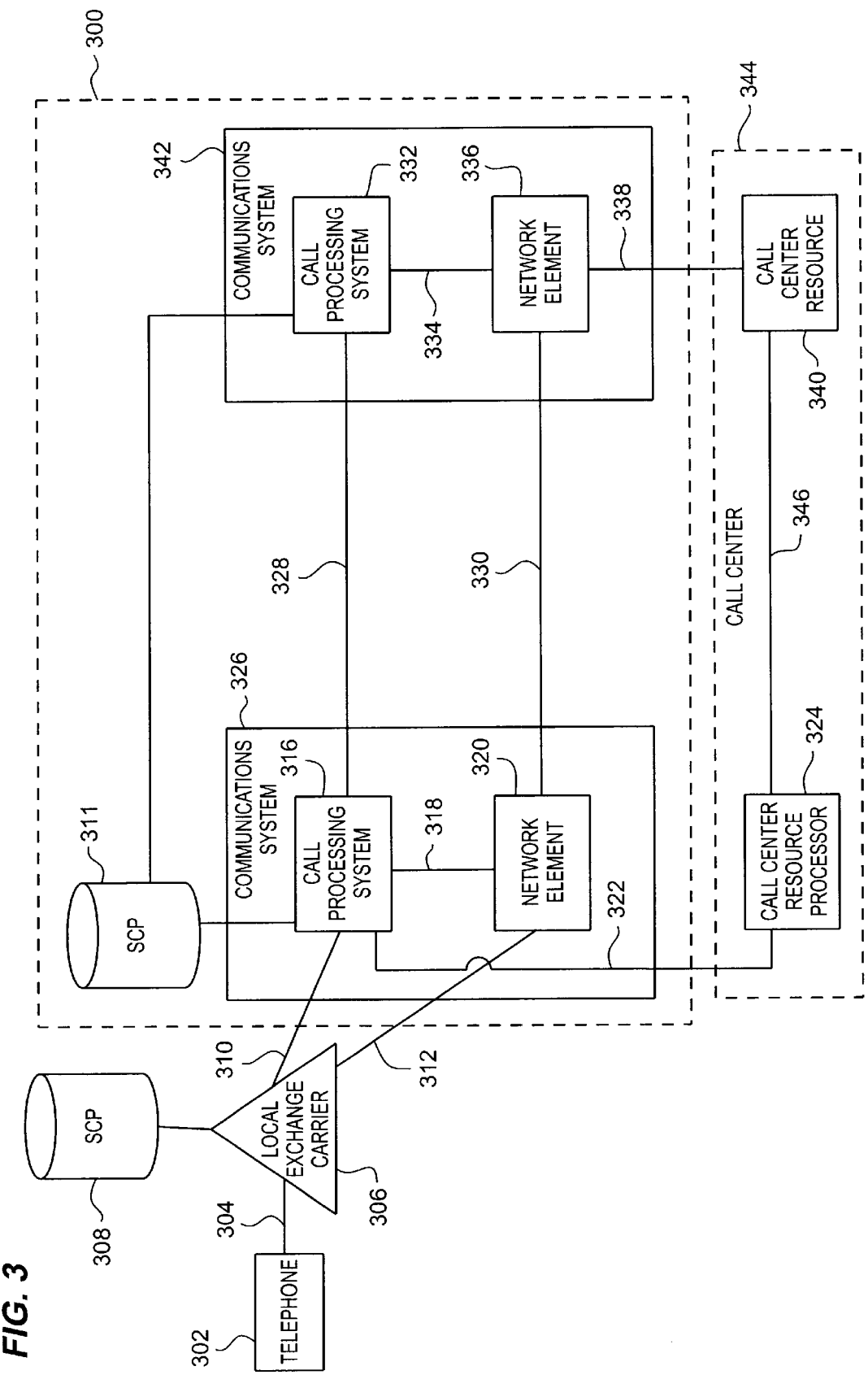
FIG. 3 is a system level block diagram of a distributed system in an example of the invention.

FIG. 3 depicts system level block diagram of a distributed configuration of the invention. A telephone 302 is connected to a local telephone switch 306 via a call link 304. Linked to the local telephone switch 306 is a service control point (SCP) 308. A broadband distributed call center communications system 300 is comprised of a communications system 326, a service control point (SCP) 314, and a communications system 342. The communications system 326 includes a call processing system 316 and a network element 320 linked by a control link 318. A signal link 310 connects the local telephone switch 306 to the call processing system 316. A call link 312 connects the local telephone switch 306 to the network element 320. The SCP 314 is linked to the call processing system 316. The call processing system 316 is connected to a call center resource processor 324 by a control link 322.

The communication system 326 is coupled to a communication system 342 by an ATM connection 330 and a Transmission Control ProtocoJIntermet Protocol (TCP/IP) connection 328. The communication system 342 is comprised of a call processing system 332 and a network element 336 connected by a control link 334. The SCP 314 is linked to the call processing system 332. The TCP/IP connection 328 connects the call processing system 316 with the call processing system 332. The ATM connection 330 connects the network element 320 with the network element 336. The ATM connection 330 typically includes ATM switches that use a Network to Network Interface (NNI). A call center 344 is comprised of a call center resource processor 324 and a call center resource 340 connected by a control link 346. A call center resource 340 is connected to the network element 336 by an ATM link 338.

Figure 4:
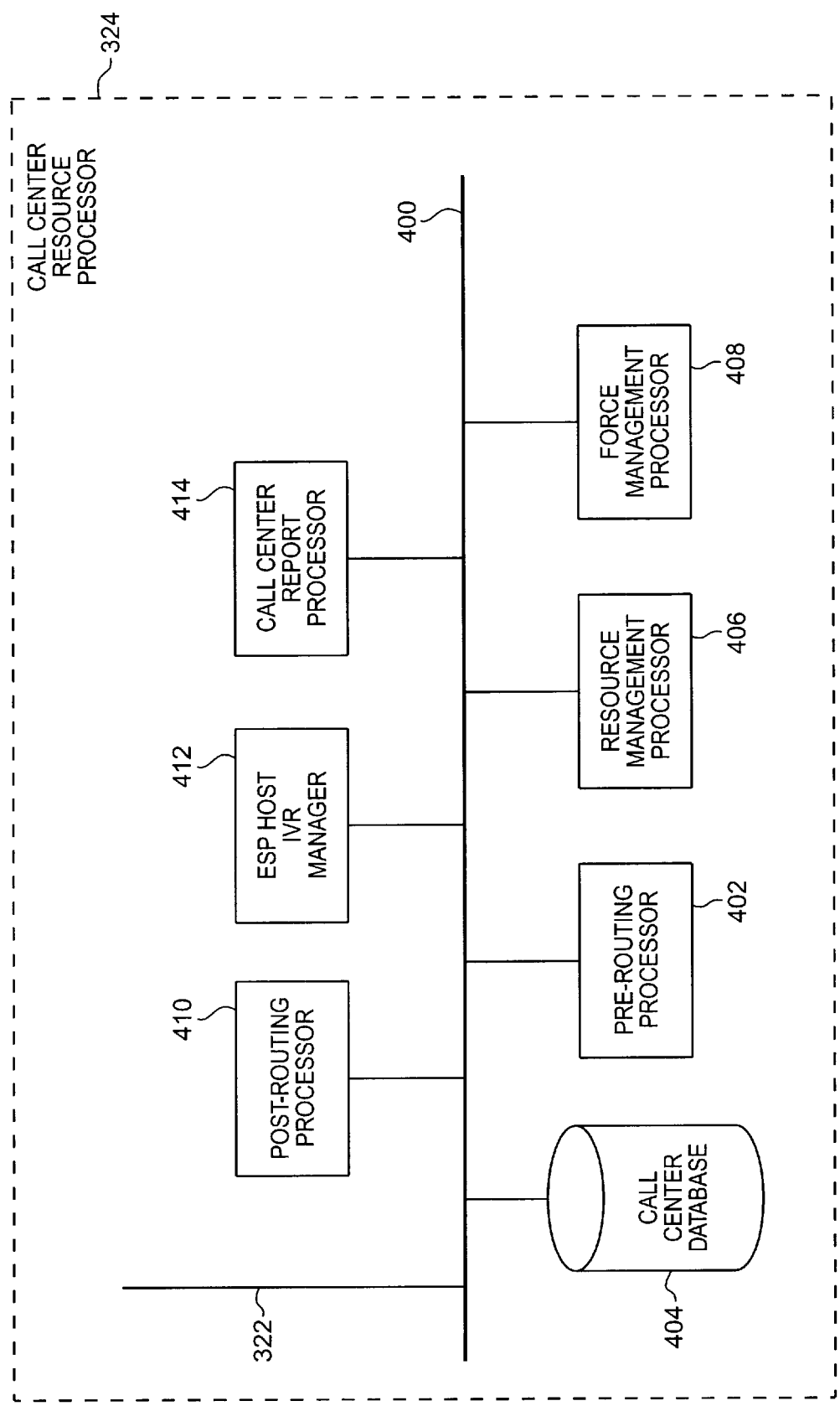
FIG. 4 is a system level block diagram for a call center resource processor of a distributed system in an example of the invention.

FIG. 4 depicts the call center resource processor 324. The control link 322 connects to an Ethernet TCP/IP network 400. The Ethernet TCP/IP network 400 is connected to a pre-routing processor 402, a call center database 404, a resource management processor 406, a force management processor 408, a post-routing processor 410, an ESP host Interactive Voice Response (IVR) manager 412, and a call center report processor 414.

The pre-routing processor 402 could be any computer processing platform that: 1) receives and processes an address query for an absolute address, 2) retrieves data from the call center database 404, 3) identifies an absolute address based on characteristics of the call and the call center resource information from the call center database 404, and 4) transmits an address response for the call processing system 316 containing the absolute address. The pre-routing processor 402 can also query the call center database 404, receive service data from the call center database 404, and transmit service data to the call processing system 316. The pre-routing processor 402 can identify the absolute address based on numerous criteria from the call and the call center resource. The invention is not limited to the following examples of criteria used in identifying the absolute address. The time of the day or the exact day could be used to route nighttime calls to daytime call center resources or play an Interactive Voice Response (IVR) for a holiday greeting. The exact day could be based on day of the week of day of the year. Caller specific information such as ANI, Dialed Number Identification Service (DNIS), geographic region of the caller, a called number, and caller entered digits could also be used to route 800 number employee benefit calls to agents handling a specific company. Allocation of call center resources based on percentages of call centers resources to calls, load balancing, trends, or maximum/minimum/average call quotas could be used to route calls to underutilized call center resources. The pre-routing processor 402 checks an availability indication if the call center resource is available. The pre-routing processor 402 also checks capability data to match call center resources that are capable to handle the call. Examples of call center capabilities are language, gender, age groups, education, income levels, seniority level, skill level, agent's knowledge of a subject, industry experience. The pre-routing processor 402 may also route calls to agents based on the distance between the caller and the call center resource.

The resource management processor 406 could be any computer processing platform that 1) obtains an availability indication for the call center resource, 2) obtains capability data for the call center resource, 3) obtains an association of an absolute address with the call center resource, and 4) transfers information to the call center database 404 associating the absolute address for the call center resource with the availability indication and the capability data for the call center resource. The availability indication reflects that the absolute address for the call center resource can be used to handle calls. The resource management processor 406 obtains an unavailability indication for the call center resource and updates the call center database 404 to reflect that the absolute address for the call center resource cannot be used to handle calls. The resource management processor 406 obtains another availability indication for the call center resource and updates the call center database 404 to reflect that the absolute address for the call center resource can be used to handle calls. The invention is not limited to the following capabilities of call center resources. Capabilities such as language, sex, age groups, education, and incomes can be matched between caller and call center resources. Priority customers may be matched with the senior agents to provide the best service. The agent's skills, knowledge of a subject, or industry experience may be used to match calls with a specific need. Also, skill levels may be configured to have more experienced agents receive calls before inexperienced agents.

The force management processor 408 could be any computer processing platform that 1) assists in planning the future capacity of the call center resources and 2) updates the call center database 404 with the planning information. Planning future capacity entails handling overflow and staffing pools of call center resources. Once the planning has been completed, the force management processor 408 will update the call center database 404, so the planning information can be available to other system components.

The post-routing processor 410 could be any computer processing platform that 1) receives and processes an address query for an absolute address, 2) retrieves call center resource information from the call center database 404, 3) identifies an absolute address based on characteristics of the call and the call center resource information from the call center database 404, and 4) transmits a transfer response to transfer the original call 316 to the absolute address. The post-routing processor 410 can identify the absolute address in the same manner as the pre-routing processor 402 identifies the absolute address as discussed above. The post-routing processor 410 may also receive data from the ESP host IVR manager 412.

The ESP host IVR manager 412 could be any computer processing platform that 1) determines which Interactive Voice Response (IVR) or Voice Response Units (VRU) are available, 2) determines which IVRs or VRUs are capable to handle the calls, and 3) updates the call center database 404 with the availability and capability information of the IVRs and VRUs. The ESP host IVR manager 412 may also play scripts made up of predefined building blocks that perform different call related functions. The building blocks could be comprised of various combinations of call related functions including, but not limited to, 1) capturing caller entered digits, 2) routing calls to IVRs, VRUs, or agents based on service data, 3) playing pre-recorded messages based on service data, date, or time of day, 4) capturing and validating of caller entered digits, and 5) collecting call information for reports. Based on the scripts, the ESP host IVR manager 412 can either perform the call related function or route the call to a IVR, VRU, or agent to perform the call related function.

The call center report processor 414 receives service data and call information and stores the service data and call information. The call center report processor may generate reports based on the service data and call information. The call center report processor 414 may receive service data including, but not limited to, ANI, caller entered digits, residential or pay phone identification, city, address, frequency of calls, payment status, last call, reason for call, outcome, and customer satisfaction. The call center report processor 414 may receive call information including, but not limited to, agent availability, agent readiness, talk time, queue time, abandon rate, number of retries, busy rate, network availability, time transferred, call length, VRU time, and wrap-up time.

Figure 5:
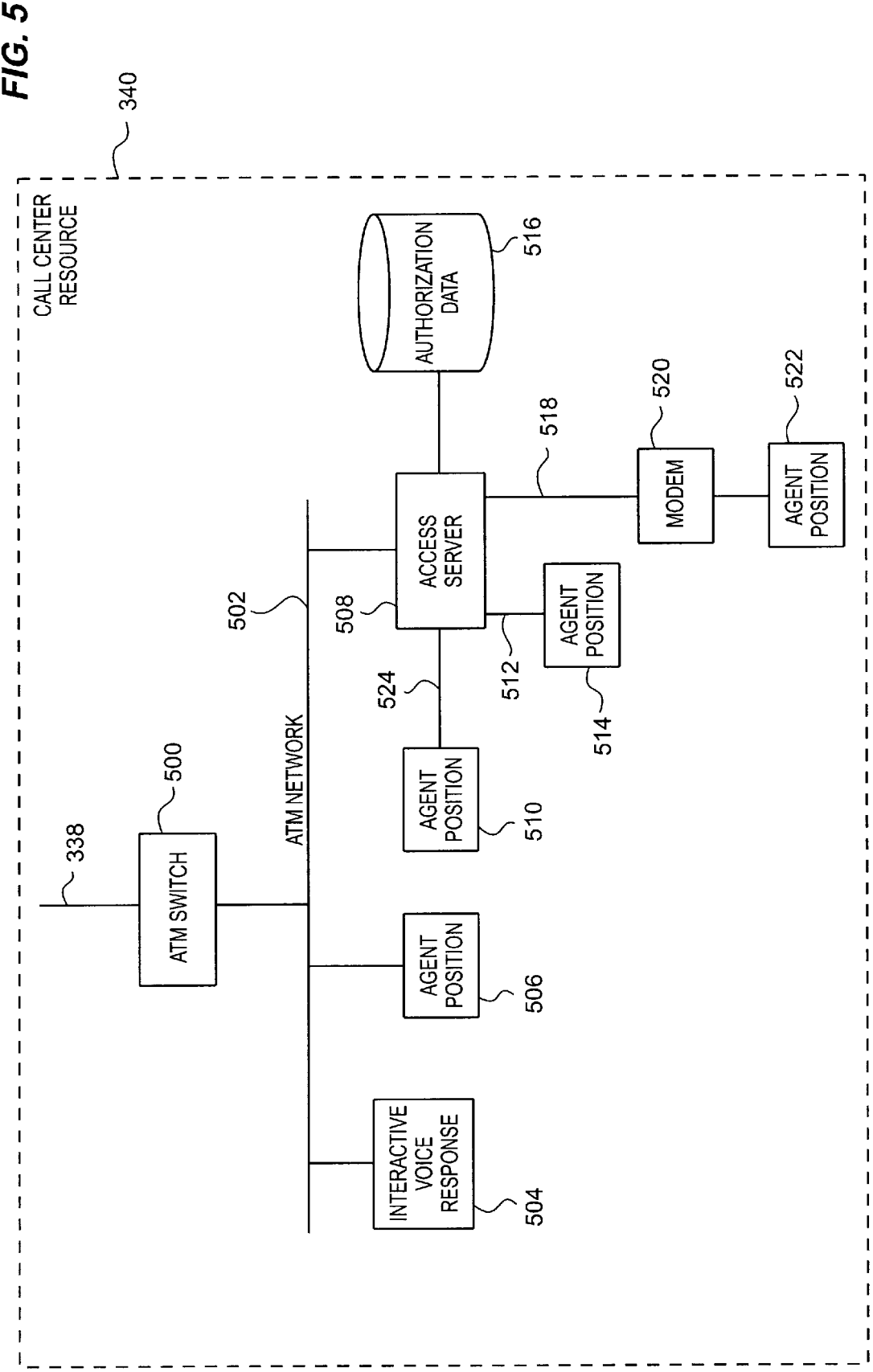
FIG. 5 is a system level block diagram for a call center resource of a distributed system in an example of the invention.

FIG. 5 depicts the call center resource 340. The ATM link 338 connects an ATM switch 500 to the network element 336 and uses a User to Network Interface (UNI). An ATM network 502 is connected to an ATM switch 500, the control link 346, an interactive voice response unit 504, an agent position 506, and an access server 508. An agent position 510 is linked to an access server 508 by an Integrated Services Digital Network link 524. An agent position 514 is connected to the access server 508 via a 100Mb link 512. An authorization database 516 is linked to the access server 508. A Point-to-Point Protocol link 518 connects the access server 508 and a modem 520. An agent position 522 is connected with a modem 520.

Figure 6:
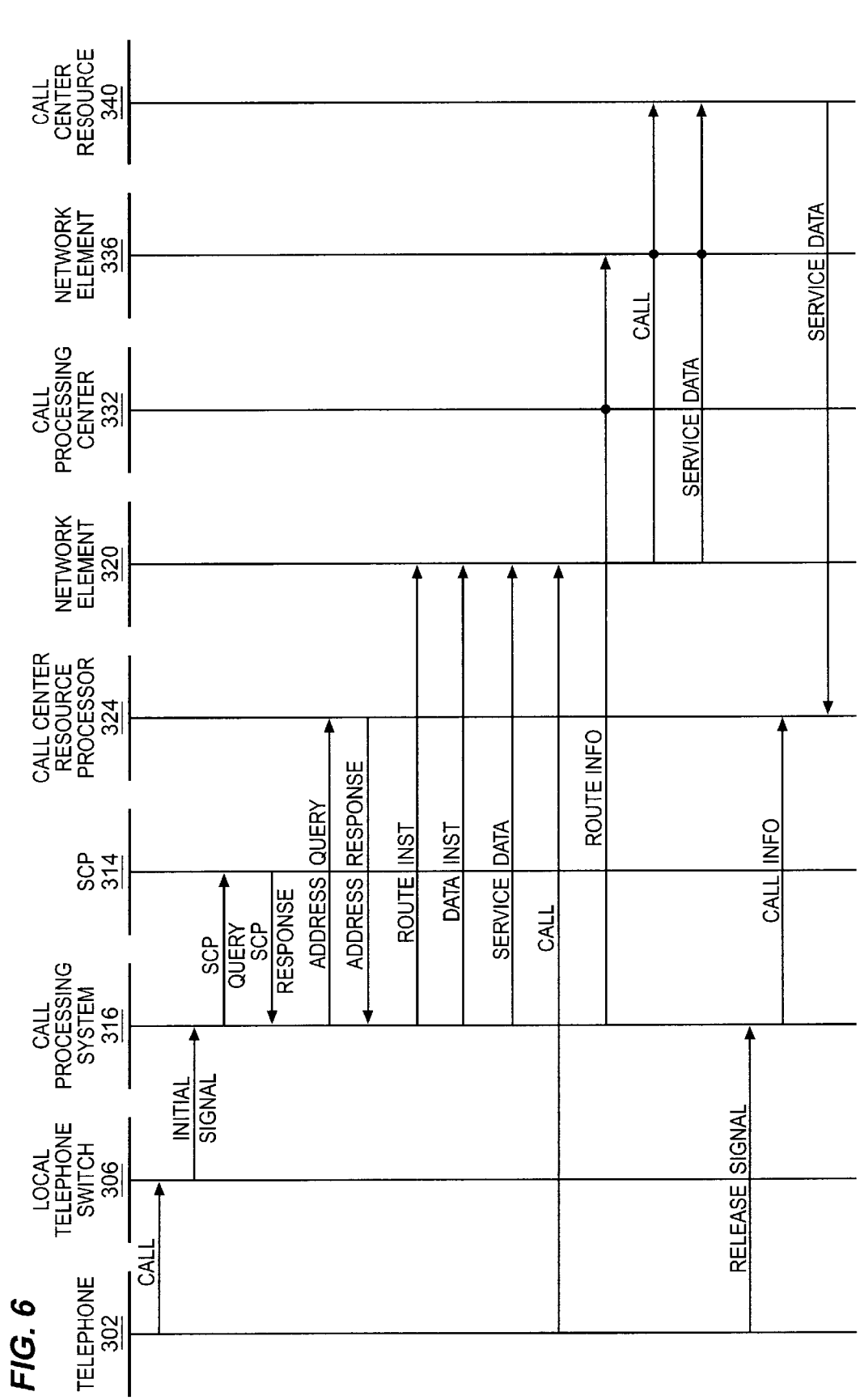
FIG. 6 is a message sequence chart of a distributed system in an example of the invention.

FIG. 6 depicts a message sequence chart for the distributed configuration of an example of the invention. The telephone 302 initializes the call through the call link 304 to the local telephone switch 306. The local telephone switch 306 transmits an Initial Address Message (IAM) signal using the Signaling System 7 protocol to the call processing system 316 via the signal link 310. In another embodiment, the local telephone switch 306 may also generate the routing query to the SCP 308 that replies with routing instructions. Upon receipt of the initial signal, the call processing system 316 transmits a SCP query to the SCP 314 to select the call center resource processor 324. The SCP 314 responds to the call processing system 316 with a SCP response. Another embodiment of the invention does not query the SCP for selecting the call center resource processor 324. After the receipt of the SCP response, the call processing system 316 transmits an address query to the call center resource processor 324 via the control link 322 for the absolute address of a call center resource 340 for the call. The call center resource processor 324 receives the address query and transmits the address response with the absolute address and the service data back to the call processing system 316 through the control link 322. Once the address response with the absolute address is received, the call processing system 316 then transmits a route instruction to the network element 320 via the control link 318 to route the call to the network element 336. The call processing system 316 transmits a data instruction to the network element 320 via the control link 318 to route the service data to the call center resource 340. The call processing system 316 also transmits the service data to the network element 320 through the control link 318.

After the absolute address is obtained, the call processing system 316 transmits route information with the absolute address to the call processing system 332 via the TCP/IP connection 328. The call processing system 332 transmits the route information with the absolute address to the network element 336 via the control link 334. The call is sent from the local telephone switch 306 to the network element 320 via the call link. Using NNI, the call is sent from the network element 320 to the network element 336. Using UNI, the network element 336 routes the call in packets to the call center resource 340 via the ATM link 338. The network element 336 places the absolute address in the call packets in response to the route information from the call processing system 332. The service data in data packets follow a similar path from the network element 320 to the call center resource 340. When the call terminates through the telephone 302, a release signal is sent to the call processing system 316. Upon termination of the call, call information is sent from the call processing system 316 to the call center resource processor 324. The call center resource 340 also transmits the service data to the call center resource processor 324 via link 346 at the termination of the call to update the call center resource processor if service data has changed. In a different embodiment, the call center resource 340 may transmit the service data for the call center resource processor via network element 336, network element 320, and call processing system 316.

Another embodiment of the invention includes the address query from the SCP 314 to the call center resource processor 324 for the absolute address instead of the address query originating from the call processing system 316. The call processing system 316 transmits a SCP query to SCP 314 to generate the address query for the call center resource processor 324. After receiving the SCP query, the SCP 314 transmits the address query to identify the absolute address of the call center resource 340 for the call center resource processor 324. The SCP 314 receives the address response including the absolute address and the service data from the call center resource processor 324. The SCP 314 then transmits the SCP response including the absolute address and the service data to the call processing system 316.

FIG. 7A depicts a message sequence chart for the call center resource processor 324. The resource management processor 406 transmits the resource information related to the availability and capability of the call center resource 340 to the call center database 404. The resource management processor 406 updates the call center database 404 with the resource information when the state of the call center resource 340 changes such as an agent becoming available. The force management processor 408 transmits the planning information for the call center resource 340 to the call center database 404. The force management processor 408 can update the call center database 404 with the planning information at regular time intervals like every five minutes. The call center database 404 will then have all the call center resource's 340 availability and capability information for identification of an absolute address.

The call processing system 316 transmits the address query to the pre-routing processor 402 for an absolute address to route the call to. The pre-routing processor 402 then transmits a database query to the call center database 404 and receives the resource information from the call center database 404. The pre-routing processor 402 also receives the service data from the call center database 404. The pre-routing processor 402 then transmits an ESP query to the ESP host IVR manager 412 for prompting information. The ESP host IVR manager 412 can play a script to receive prompting information such as customer entered digits. Other variations of scripts are discussed above. The ESP host IVR manager then transmits the prompting information to the pre-routing processor 402.

The pre-routing processor 402 then identifies the absolute address based on the resource information. The pre-routing processor 402 may also base identification on any service data including the prompting information. After identification, the pre-routing processor 402 transmits an address response with the absolute address and the service data to the call processing system 316 through the control link 322.

FIG. 7B depicts a continuation message sequence chart for the call center resource processor 324. In FIG. 7B, if the call needs to be transferred to another agent, the call processing system 316 transmits a transfer query to the post-routing processor 410 for an absolute address. The post-routing processor 410 then receives the transfer query and transmits a database query to the call center database 404. The post-routing processor 410 then receives the resource information related to the availability and capability of the call center resource 340 from the call center database 404. The post-routing processor 410 then identifies the absolute address for the new agent to transfer the call to based on the resource information. The post-routing processor 410 transmits an address response with the absolute address to the call processing system 316. Once the call is completed, the call processing system 316 transmits the call information and service data to the call center report processor 414 for reporting purposes.

FIG. 8 depicts a message sequence chart for the call center resource 340. The call comes from the network element 336 via ATM link 338 to the ATM Switch 500. Using the absolute address in the call packets, the ATM switch 500 routes the call to the agent position 506. The service data comes from the network element 336 via ATM link 338 to the ATM Switch 500. Using the absolute address in the data packets, the ATM switch 500 routes the service data to the agent position 506. After the call is completed, the agent position 506 transmits call information to the call center resource processor 324 via the ATM network 502 and the control link 346. The call information could be caller number, called number, customer information, caller-entered digits/audio, and product/service information related to the call. Those skilled in the art will appreciate numerous variations in receiving calls by agent positions and interactive voice responses.

FIGS. 9–47 depict an example of systems that could be adapted by those skilled in the art to support the invention. In particular, the system described below will be adapted for use as communication systems 326 and 342 in FIG. 3.

The Controllable ATM Matrix

Figure 9:
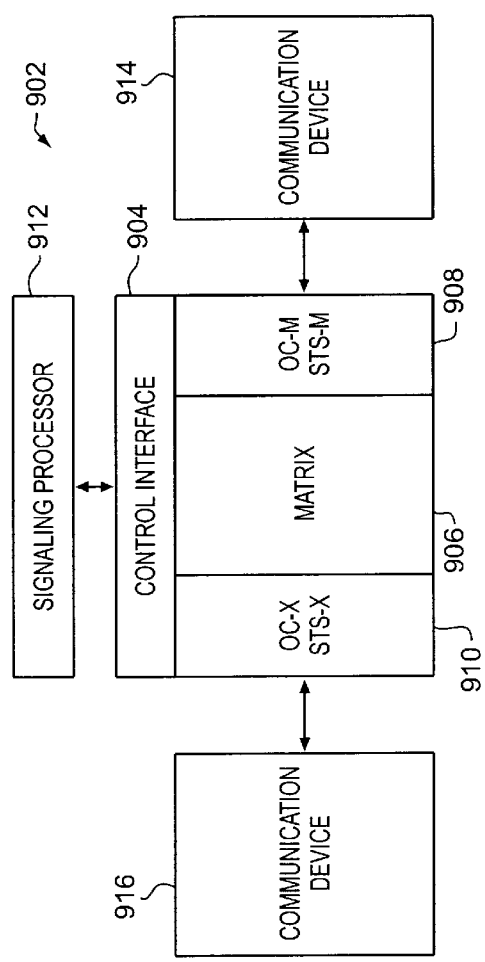
FIG. 9 is a functional diagram of a controllable asynchronous transfer mode matrix in accordance with the present invention.

FIG. 9 illustrates an exemplary embodiment of a controllable asynchronous transfer mode (ATM) matrix (CAM), but other CAMs that support the requirements of the invention also are applicable. The CAM 902 may receive and transmit ATM formatted user communications or call signaling.

The CAM 902 preferably has a control interface 904, a controllable ATM matrix 906, an optical carrier-M/ synchronous transport signal-M (OC-M/STS-M) interface 908, and an OC-X/STS-X interface 910. As used herein in conjunction with OC or STS, "M" refers to an integer, and "X" refers to an integer.

The control interface 904 receives control messages originating from the signaling processor 912, identifies virtual connection assignments in the control messages, and provides these assignments to the matrix 906 for implementation. The control messages may be received over an ATM virtual connection and through either the OC-M/STS-M interface 908 or the OC-X/STS-X interface 910 through the matrix 906 to the control interface 904, through either the OC-M/STS-M interface or the OC-X/STS-X interface directly to the control interface, or through the control interface from a link.

The matrix 906 is a controllable ATM matrix that provides cross connect functionality in response to control messages from the signaling processor 912. The matrix 906 has access to virtual path/virtual channels (VP/VCs) over which it can connect calls. For example, a call can come in over a VPNVC through the OC-M/STS-M interface 908 and be connected through the matrix 906 over a VPNVC through the OC-X/STS-X interface 910 in response to a control message received by the signaling processor 912 through the control interface 904. Alternately, a call can be connected in the opposite direction. In addition, the a call can be received over a VPNVC through the OC-M/STS-M interface 908 or the OC-X/STS-X interface 910 and be connected through the matrix 906 to a different VPIVC on the same OC-M/ STS-M interface or the same OC-X/STS-X interface.

The OC-M/STS-M interface 908 is operational to receive ATM cells from the matrix 906 and to transmit the ATM cells over a connection to the communication device 914. The OC-M/STS-M interface 908 also may receive ATM cells in the OC or STS format and transmit them to the matrix 906.

The OC-XISTS-X interface 910 is operational to receive ATM cells from the matrix 906 and to transmit the ATM cells over a connection to the communication device 916. The OC-X/STS-X interface 910 also may receive ATM cells in the OC or STS format and transmit them to the matrix 906.

Call signaling may be received through and transferred from the OC-M/STS-M interface 908. Also, call signaling may be received through and transferred from the OC-X/ STS-X interface 910. The call signaling may be connected on a connection or transmitted to the control interface directly or via the matrix 906.

The signaling processor 912 is configured to transmit control messages to the CAM 902 to implement particular features on particular VP/VC circuits. Alternatively, lookup tables may be used to implement particular features for particular VP/VCs.

Figure 10:
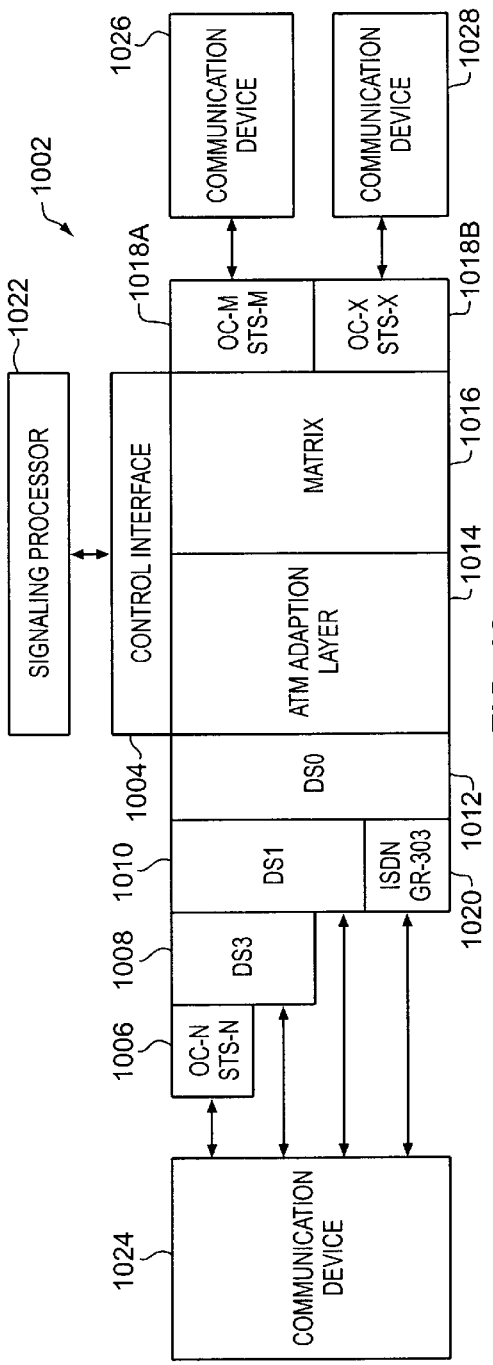
FIG. 10 is a functional diagram of a controllable asynchronous transfer mode matrix with time division multiplex capability in accordance with the present invention.

FIG. 10 illustrates another exemplary embodiment of a CAM which has time division multiplex (TDM) capability, but other CAMs that support the requirements of the invention also are applicable. The CAM 1002 may receive and transmit in-band and out-of-band signaled calls.

The CAM 1002 preferably has a control interface 1004, an OC-N/STS-N interface 1006, a digital signal level 3 (DS3) interface 1008, a DS1 interface 1010, a DSO interface 1012, an ATM adaptation layer (AAL) 1014, a controllable ATM matrix 1016, an OC-M/STS-M interface 1018A, an OC-X/STS-X interface 1018B, and an ISDN/GR-303 interface 1020. As used herein in conjunction with OC or STS, "N" refers to an integer, "M" refers to an integer, and "X" refers to an integer.

The control interface 1004 receives control messages originating from the signaling processor 1022, identifies DSO and virtual connection assignments in the control messages, and provides these assignments to the AAL 1014 or the matrix 1016 for implementation. The control messages may be received over an ATM virtual connection and through the OC-M/STS-M interface 1018A to the control interface 1004, through the OC-X/STS-X interface 1018B and the matrix 1016 to the control interface, or directly through the control interface from a link.

The OC-N/STS-N interface 1006, the DS3 interface 1008, the DS1 interface 1010, the DSO interface 1012, and the ISDN/GR-303 interface 1020 each can receive user communications from a communication device 1024. Likewise, the OC-M/STS-M interface 1018A and the OC-X/STS-X interface 1018B can receive user communications from the communication devices 1026 and 1028.

The OC-N/STS-N interface 1006 receives OC-N formatted user communications and STS-N formatted user communications and converts the user communications to the DS3 format. The DS3 interface 1008 receives user communications in the DS3 format and converts the user communications to the DS1 format. The DS3 interface 1008 can receive DS3s from the OC-N/STS-N interface 1006 or from an external connection. The DS1 interface 1010 receives the user communications in the DS1 format and converts the user communications to the DS0 format. The DS1 interface 1010 receives DS1s from the DS3 interface 1008 or from an external connection. The DS0 interface 1012 receives user communications in the DS0 format and provides an interface to the AAL 1014. The ISDN/GR-303 interface 1020 receives user communications in either the ISDN format or the GR-303 format and converts the user communications to the DS0 format. In addition, each interface may transmit user communications in like manner to the communication device 1024.

The OC-M/STS-M interface 1018A is operational to receive ATM cells from the AAL 1014 or from the matrix 1016 and to transmit the ATM cells over a connection to the communication device 1026. The OC-M/STS-M interface 1018A also may receive ATM cells in the OC or STS format and transmit them to the AAL 1014 or to the matrix 1016.

The OC-X/STS-X interface 1018B is operational to receive ATM cells from the AAL 1014 or from the matrix 1016 and to transmit the ATM cells over a connection to the communication device 1028. The OC-X/STS-X interface 1018B also may receive ATM cells in the OC or STS format and transmit them to the AAL 1014 or to the matrix 1016.

Call signaling may be received through and transferred from the OC-N/STS-N interface 1006 and the ISDN/GR-303 interface 1020. Also, call signaling may be received through and transferred from the OC-M/STS-M interface 1018A and the OCX/STS-X interface 1018B. The call signaling may be connected on a connection or transmitted to the control interface directly or via an interface as explained above.

The AAL 1014 comprises both a convergence sublayer and a segmentation and reassembly (SAR) sublayer. The AAL 1014 obtains the identity of the DS0 and the ATM VP/VC from the control interface 1004. The AAL 1014 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for calls is described in U.S. Pat. No. 5,806,553 entitled "Cell Processing for Voice Transmission," which is incorporated herein by reference.

Calls with multiple 64 Kilo-bits per second (Kbps) DS0s are known as N×64 calls. If desired, the AAL 1014 can be configured to accept control messages through the control interface 1004 for N×64 calls. The CAM 1002 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 1016 is a controllable ATM matrix that provides cross connect functionality in response to control messages from the signaling processor 1022. The matrix 1016 has access to VP/VCs over which it can connect calls. For example, a call can come in over a VPIVC through the OC-M/STS-M interface 1018A and be connected through the matrix 1016 over a VP/VC through the OC-X/STS-X interface 1018B in response to a control message received by the signaling processor 1022 through the control interface 1004. Alternately, the matrix 1016 may transmit a call received over a VP/VC through the OC-M/STS-M interface 1018A to the AAL 1014 in response to a control message received by the signaling processor 1022 through the control interface 1004. Communications also may occur in opposite directions through the various interfaces.

In some embodiments, it may be desirable to incorporate digital signal processing capabilities at, for example, the DS0 level. It also may be desired to apply echo control to selected DS0 circuits. In these embodiments, a signal processor may be included. The signaling processor 1022 is configured to transmit control messages to the CAM 1002 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 11 illustrates an exemplary embodiment of an interworking unit which is an ATM interworking unit 1102 suitable for the present invention for use with a SONET system. Other interworking units that support the requirements of the invention also are applicable. The ATM interworking unit 1102 may receive and transmit in-band and out-of-band calls.

The ATM interworking unit 1102 preferably has a control interface 1104, an O-CN/STS-N interface 1106, a DS3 interface 1108, a DS1 interface 1110, a DS0 interface 1112, a signal processor 1114, an AAL 1116, an OC-M/STS-M interface 1118, and an ISDN/GR-303 interface 1120. As used herein in conjunction with OC or STS, "N" refers to an integer, and "M" refers to an integer.

The control interface 1104 receives control messages originating from the signaling processor 1122, identifies DS0 and virtual connection assignments in the control messages, and provides these assignments to the AAL 1116 for implementation.

The control messages are received over an ATM virtual connection and through the OC-N/STS-M interface 1118 to the control interface 1104 or directly through the control interface from a link.

The OC-N/STS-N interface 1106, the DS3 interface 1108, the DS1 interface 1110, the DS0 interface 1112, and the ISDN/GR-303 interface 1120 each can receive user communications from a communication device 1124. Likewise, the OC-M/STS-M interface 1118 can receive user communications from a communication device 1126.

The OC-N/STS-N interface 1106 receives OC-N formatted user communications and STS-N formatted user communications and demultiplexes the user communications to the DS3 format. The DS3 interface 1108 receives user communications in the DS3 format and demultiplexes the user communications to the DS1 format. The DS3 interface 1108 can receive DS3s from the OC-N/STS-N interface 1106 or from an external connection. The DS1 interface 1110 receives the user communications in the DS1 format and demultiplexes the user communications to the DS0 format. The DS1 interface 1110 receives DS1s from the DS3 interface 1108 or from an external connection. The DS0 interface 1112 receives user communications in the DS0 format and provides an interface to the AAL 1116. The ISDN/GR-303 interface 1120 receives user communications in either the ISDN format or the GR-303 format and converts the user communications to the DS0 format. In addition, each interface may transmit user communications in like manner to the communication device 1124.

The OC-M/STS-M interface 1118 is operational to receive ATM cells from the AAL 1116 and to transmit the ATM cells over the connection to the communication device 1126. The OC-M/STS-M interface 1118 also may receive ATM cells in the OC or STS format and transmit them to the AAL 1116.

Call signaling may be received through and transferred from the OC-N/STS-N interface 1106 and the ISDN/GR-303 interface 1120. Also, call signaling may be received through and transferred from the OC-M/STS-M interface 1118. The call signaling may be connected on a connection or transmitted to the control interface directly or via another interface as explained above.

The AAL 1116 comprises both a convergence sublayer and a segmentation and reassembly (SAR) sublayer. The AAL 1116 obtains the identity of the DS0 and the ATM VP/VC from the control interface 1104. The AAL 1116 is operational to convert between the DS0 format and the ATM format.

If desired, the AAL 1116 can be configured to accept control messages through the control interface 1104 for N×64 calls. The ATM interworking unit 1102 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 1114 is included either separately (as shown) or as a part of the DS0 interface 1112. The signaling processor 1122 is configured to transmit control messages to the ATM interworking unit 1102 to implement particular features on particular DS0 circuits. Alternatively, lookup tables may be used to implement particular features for particular circuits or VP/VCs.

FIG. 12 illustrates another exemplary embodiment of an interworking unit which is an ATM interworking unit 1202 suitable for the present invention for use with an SDH system. The ATM interworking unit 1202 preferably has a control interface 1204, an STM-N electrical/optical (E/O) interface 1206, an E3 interface 1208, an E1 interface 1210, an E0 interface 1212, a signal processor 1214, an AAL 1216, an STM-M electrical/optical (E/O) interface 1218, and a DPNSS interface 1220. As used herein in conjunction with STM, "N" refers to an integer, and "M" refers to an integer.

The control interface 1204 receives control messages from the signaling processor 1222, identifies E0 and virtual connection assignments in the control messages, and provides these assignments to the AAL 1216 for implementation. The control messages are received over an ATM virtual connection and through the STM-M interface 1218 to the control interface 1104 or directly through the control interface from a link.

The STM-N E/O interface 1206, the E3 interface 1208, the E1 interface 1210, the E0 interface 1212, and the DPNSS interface 1220 each can receive user communications from a second communication device 1224. Likewise, the STM-M E/O interface 1218 can receive user communications from a third communication device 1226.

The STM-N E/O interface 1206 receives STM-N electrical or optical formatted user communications and converts the user communications from the STM-N electrical or STM-N optical format to the E3 format. The E3 interface 1208 receives user communications in the E3 format and demultiplexes the user communications to the E1 format. The E3 interface 1208 can receive E3s from the STM-N E/O interface 1206 or from an external connection. The E1 interface 1210 receives the user communications in the E1 format and demultiplexes the user communications to the E0 format. The E1 interface 1210 receives E1s from the STM-N E/O interface 1206 or the E3 interface 1208 or from an external connection. The E0 interface 1212 receives user communications in the E0 format and provides an interface to the AAL 1216. The DPNSS interface 1220 receives user communications in the DPNSS format and converts the user communications to the E0 format. In addition, each interface may transmit user communications in a like manner to the communication device 1224.

The STM-M E/O interface 1218 is operational to receive ATM cells from the AAL 1216 and to transmit the ATM cells over the connection to the communication device 1226. The STM-M E/O interface 1218 may also receive ATM cells in the STM-M E/O format and transmit them to the AAL 1216.

Call signaling may be received through and transferred from the STM-N E/O interface 1206 and the DPNSS interface 1220. Also, call signaling may be received through and transferred from the STM-M E/O interface 1218. The call signaling may be connected on a connection or transmitted to the control interface directly or via another interface as explained above.

The AAL 1216 comprises both a convergence sublayer and a segmentation and reassembly (SAR) sublayer. The AAL obtains the identity of the E0 and the ATM VP/VC from the control interface 1204. The AAL 1216 is operational to convert between the E0 format and the ATM format, either in response to a control instruction or without a control instruction. AAL's are known in the art. If desired, the AAL 1216 can be configured to receive control messages through the control interface 1204 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 1214 is included either separately (as shown) or as a part of the E0 interface 1212. The signaling processor 1222 is configured to transmit control messages to the ATM interworking unit 1202 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," which is incorporated herein by reference.

In addition to selecting connections, the signaling processor performs many other functions in the context of call processing. It not only can control routing and select the actual connections, but it also can obtain an absolute address, validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 13:
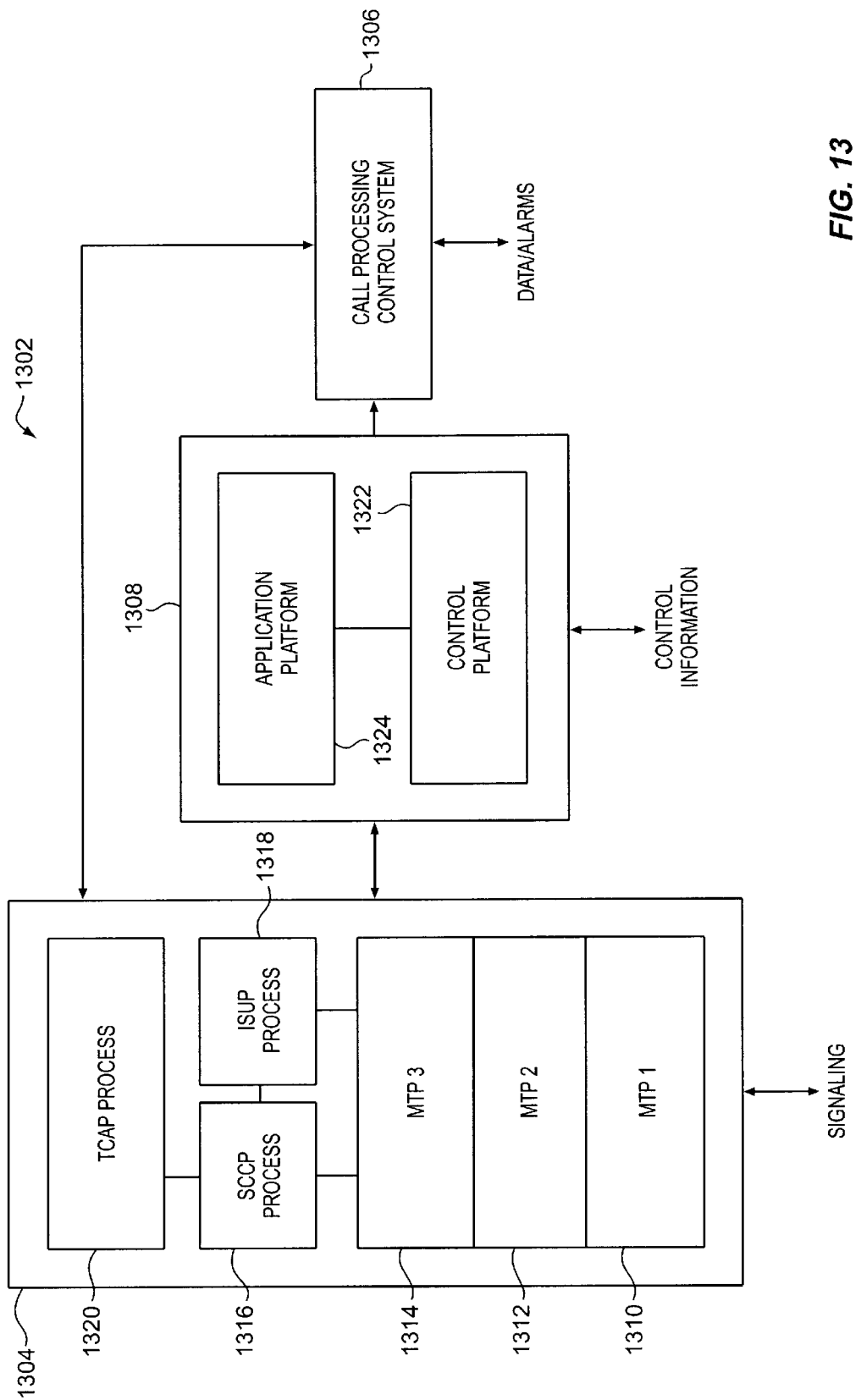
FIG. 13 is a block diagram of a signaling processor constructed in accordance with the present system.

FIG. 13 depicts an embodiment of a signaling processor. Other versions also are contemplated. In the embodiment of FIG. 13, the signaling processor 1302 has a signaling interface 1304, a call processing control system 1306 (CPCS), and a call processor 1308. It will be appreciated that the signaling processor 1302 may be constructed as modules in a single unit or as multiple units.

The signaling interface 1304 is coupled externally to signaling systems1—preferably to signaling systems having a message transfer part (MTP), an ISDN user part (ISUP), a signaling connection control part (SCCP), an intelligent network application part (INAP), and a transaction capabilities application part (TCAP). The signaling interface 1304 preferably is a platform that comprises an MTP level 1 1310, an MTP level 2 1312, an MTP level 3 1314, an SCCP process 1316, an ISUP process 1318, and a TCAP process 1320. The signaling interface 1304 also has INAP functionality.

The signaling interface 1304 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 1304 is operational to transmit, process, and receive call signaling. The TCAP, SCCP, ISUP, and INAP functionality use the services of the MTP to transmit and receive the messages. Preferably, the signaling interface 1304 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 1304 process information that is received in message signal units (MSUs) and convert the information to call information elements that are sent to the call processor 1308 to be processed. A call information element may be, for example, an ISUP IAM message parameter from the MSU. The signaling interface 1304 strips the unneeded header information from the MSU to isolate the message information parameters and passes the parameters to the call processor 1308 as the call information elements. Examples of these parameters are the called number, the calling number, and user service information. Other examples of messages with information elements are an ANM, an ACM, an REL, an RLC, and an INF. In addition, call information elements are transferred from the call processor 1308 back to the signaling interface 1304, and the information elements are reassembled into MSUs and transferred to a signaling point.

The CPCS 1306 is a management and administration system. The CPCS 1306 is the user interface and external systems interface into the call processor 1308. The CPCS 1306 serves as a collection point for call-associated data such as logs, operational measurement data, statistical information, accounting information, and other call data. The CPCS 1306 can configure the call-associated data and/or transmit it to reporting centers.

The CPCS 1306 accepts data, such as the translations, from a source such as an operations system and updates the data in the tables in the call processor 1308. The CPCS 1306 ensures that this data is in the correct format prior to transferring the data to the call processor 1308. The CPCS 1306 also provides configuration data to other devices including the call processor 1308, the signaling interface 1304, the interworking unit (not shown), and the controllable ATM matrix (not shown). In addition, the CPCS 1306 provides for remote control of call monitoring and call tapping applications from the call processor 1308.

The CPCS 1306 also serves as a collection point for alarms. Alarm information is transferred to the CPCS 1306. The CPCS 1306 then transports alarm messages to the required communication device. For example, the CPCS 1306 can transport alarms to an operations center.

The CPCS 1306 also has a human-machine interface (HMI). This allows a person to log onto the CPCS 1306 and manage data tables or review data tables in the CPCS or provide maintenance services.

The call processor 1308 processes call signaling and controls an ATM interworking unit, such as an ATM interworking multiplexer (mux) that performs interworking of DS0s and VP/VCs, and an ATM matrix. However, the call processor 1308 may control other communications devices and connections in other embodiments.

The call processor 1308 comprises a control platform 1322 and an application platform 1324. Each platform 1322 and 1324 is coupled to the other platform.

The control platform 1322 is comprised of various external interfaces including an interworking unit interface, a controllable ATM matrix, an echo interface, a resource control interface, a call information interface, and an operations interface. The control platform 1322 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to transmit and detect a tone for a continuity test.

The call information interface transfers pertinent call information to a call information processing system, such as to the CPCS 1306. Typical call information includes accounting information, such as the parties to the call, time points for the call, and any special features applied to the call. One skilled in the art will appreciate how to produce the software for the interfaces in the control platform 1322.

The application platform 1324 processes signaling information from the signaling interface 1304 to select connections. The identity of the selected connections are provided to the control platform 1322 for the interworking unit interface and/or for the controllable ATM matrix interface. The application platform 1324 is responsible for validation, translation, routing, call control, exceptions, screening, and error handling. In addition to providing the control requirements for the interworking unit and the controllable ATM matrix, the application platform 1324 also provides requirements for echo control and resource control to the appropriate interface of the control platform 1322. In addition, the application platform 1324 generates signaling information for transmission by the signaling interface 1304. The signaling information might be for ISUP, INAP, or TCAP messages to external network elements. Pertinent information for each call is stored in an enhanced circuit data block (ECDB) for the call. The ECDB can be used for tracking and accounting the call.

The application platform 1324 preferably operates in general accord with the Basic Call State Model (BCSM) defined by the ITU. An instance of the BCSM is created to handle each call. The BCSM includes an originating process and a terminating process. The application platform 1324 includes a service switching function (SSF) that is used to invoke the service control function (SCF). Typically, the SCF is contained in an SCP. The SCF is queried with TCAP or INAP messages that are transported by the signaling interface 1304 and which are initiated with information from the SSF in the application platform 1324. The originating or terminating processes will access remote databases with intelligent network (IN) functionality via the SSF.

Software requirements for the application platform 1324 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 1308 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 13, it can be seen that the application platform 1324 processes signaling information to control numerous systems and facilitate call connections and services. The SS7 signaling is exchanged between the call processor 1308 and external components through the signaling interface 1304, and control information is exchanged with external systems through the control platform 1322. Advantageously, the signaling interface 1304, the CPCS 1306, and the call processor 1308 are not integrated into a switch central processing unit (CPU) that is coupled to a switching matrix. Unlike an SCP, the components of the signaling processor 1302 are capable of processing ISUP messages independently of TCAP queries.

SS7 Message Designations

SS7 messages are well known. Designations for various SS7 messages commonly are used. Those skilled in the art are familiar with the following message designations:
ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA Loop Back Acknowledgment
PAM—Pass Along Message
REL—Release
RLC—Release Complete
RSC—Reset Circuit
RES—Resume
SUS—Suspend
UBL Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 14:
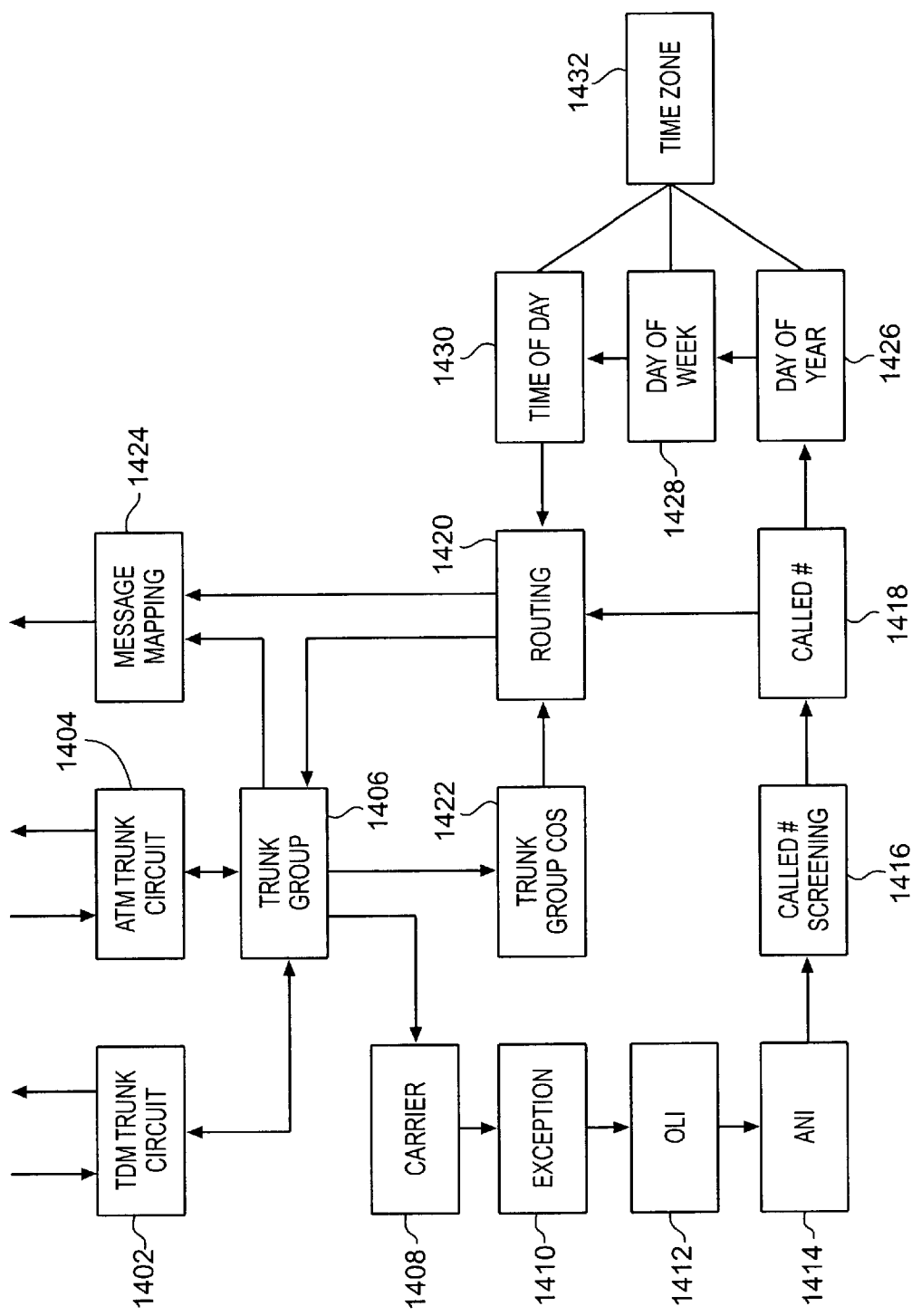
FIG. 14 is a block diagram of a data structure having tables that are used in the signaling processor.

FIG. 14 depicts an exemplary data structure preferably used by the call processor 1302 of FIG. 13 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 14.

The primary data structure has a TDM trunk circuit table 1402, an ATM trunk circuit table 1404, a trunk group table 1406, a carrier table 1408, an exception table 1410, an originating line information (OLI) table 1412, an automatic number identification (ANI) table 1414, a called number screening table 1416, a called number table 1418, a routing table 1420, a trunk group class of service (COS) table 1422, and a message mapping table 1424. Also included in the data structure are a day of year table 1426, a day of week table 1428, a time of day table 1430, and a time zone table 1432.

The TDM trunk circuit table 1402 contains information required to provision the TDM side of a connection from the call processor site. Each circuit on the TDM side of a connection has an entry. The TDM trunk circuit table 1402 is accessed from the trunk group table 1406 or an external call process, and it points to the trunk group table.

The ATM trunk circuit table 1404 contains information required to provision the ATM side of a connection. Typically, one record appears in this table per ATM trunk group. Although, the system can be configured alternately for multiple records per trunk group. The ATM trunk circuit table 1404 is accessed from the trunk group table 1406 or an external call process, and it points to the trunk group table.

The trunk group table 1406 contains information that is required to build trunk groups out of different trunk members identified in the TDM and ATM trunk circuit tables 1402 and 1404. The trunk group table 1406 contains information related to the originating and terminating trunk groups. The trunk group table 1406 typically points to the carrier table 1408. Although, the trunk group table 1406 may point to the exception table 1410, the OLI table 1412, the ANI table 1414, the called number screening table 1416, the called number table 1418, the routing table 1420, the day of year table 1426, the day of week table 1428, the time of day table 1430, and the treatment table (see FIG. 15).

For default processing of an IAM of an outgoing call in the forward direction, when the call process determines call setup and routing parameters for user communications on the originating portion, the trunk group table 1406 is the next table after the TDM and ATM trunk circuit tables 1402 and 1404, and the trunk group table points to the carrier table 1408. For default processing of an IAM of an outgoing call in the forward direction, when the call process determines call setup and routing parameters for user communications on the terminating portion, the trunk group table 1406 is the next table after the routing table 1420, and the trunk group table points to the TDM or ATM trunk circuit table 1402 or 1404. For default processing of an ACM or an ANM of an outgoing call in the originating direction, when the call process determines parameters for signaling, the trunk group table 1406 is the next table after the TDM or ATM trunk circuit table 1402 or 1404, and the trunk group table points to the message mapping table 1424. It will be appreciated that this is the default method, and, as explained herein, other implementations of table processing occur.

The carrier table 1408 contains information that allows calls to be screened based, at least in part, on the carrier information parameter and the carrier selection parameter. The carrier table 1408 typically points to the exception table 1410. Although, the carrier table 1408 may point to the OLI table 1412, the ANI table 1414, the called number screening table 1416, the called number table 1418, the routing table 1420, the day of year table 1426, the day of week table 1428, the time of day table 1430, the treatment table (see FIG. 15), and the database services table (see FIG. 16).

The exception table 1410 is used to identify various exception conditions related to the call that may influence the routing or handling of the call. The exception table 1410 contains information that allows calls to be screened based, at least in part, on the called party number and the calling party's category. The exception table 1410 typically points to the OLI table 1412. Although, the exception table 1410 can point to the ANI table 1414, the called number screening table 1416, the called number table 1418, the routing table 1420, the day of year table 1426, the day of week table 1428, the time of day table 1430, the call rate table, the percent control table, the treatment table (see FIG. 15), and the database services table (see FIG. 16).

The OLI table 1412 contains information that allows calls to be screened based, at least in part, on originating line information in an IAM. The OLI table 1412 typically points to the ANI table 1414. Although, the OLI table can point to the called number screening table 1416, the called number table 1418, the routing table 1420, the day of year table 1426, the day of week table 1428, the time of day table 1430, and the treatment table (see FIG. 15).

The ANI table 1414 is used to identify any special characteristics related to the caller's number, which is commonly known as automatic number identification. The ANI table 1414 is used to screen and validate an incoming ANI. ANI specific requirements such as queuing, echo cancellation, time zone, and treatments can be established. The ANI table 1414 typically points to the called number screening table 1416. Although, the ANI table 1414 can point to the called number table 1418, the routing table 1420, the day of year table 1426, the day of week table 1428, the time of day table 1430, and the treatment table (see FIG. 15).

The called number screening table 1416 is used to screen called numbers. The called number screening table 1416 determines the disposition of the called number and the nature of the called number. The called number screening table 1416 is used to provide the trigger detection point (TDP) for an AIN SCP TCAP query. It is used, for example, with the local number portability (NP) feature. The called number screening table can invoke a TCAP. The called number screening table 1416 typically points to the called number table 1418. Although, the called number screening table 1416 can point to the routing table 1420, the treatment table, the call rate table, the percent table (see FIG. 15), and the database services table (see FIG. 16).

The called number table 1418 is used to identify routing requirements based on, for example, the called number. This will be the case for standard calls. The called number table 1418 typically points to the routing table 1410. In addition, the called number table 1426 can be configured to alternately point to the day of year table 1426. The called number table 1418 can also point to the treatment table (see FIG. 15) and the database services table (see FIG. 16).

The routing table 1420 contains information relating to the routing of a call for various connections. The routing table 1420 typically points to the treatment table (see FIG. 15). Although, the routing table also can point to the trunk group table 1406 and the database services table (see FIG. 16).

For default processing of an IAM of an outgoing call in the forward direction, when the call process determines call setup and routing parameters for user communications, the routing table 1420 is the next table after the called number table 1418, and the routing table points to the trunk group table 1406. For default processing of an IAM of an outgoing call in the forward direction, when the call process determines parameters for signaling, the routing table 1420 is the next table after the called number table 1418, and the routing table points to the message mapping table 1424. It will be appreciated that this is the default method, and, as explained herein, other implementations of table processing occur.

The trunk group COS table 1422 contains information that allows calls to be routed differently based on the class of service assigned to the originating trunk group and to the terminating trunk group. The trunk group COS table can point to the routing table 1420 or the treatment table (see FIG. 15).

When the trunk group COS table 1422 is used in processing, after the routing table 1420 and the trunk group table 1406 are processed, the trunk group table points to the trunk group COS table. The trunk group COS table points back to the routing table 1420 for further processing. Processing then continues with the routing table 1420 which points to the trunk group table 1406, and the trunk group table which points to the TDM or ATM trunk circuit table 1402 or 1404. It will be appreciated that this is the default method, and, as explained herein, other implementations of table processing occur.

The message mapping table 1424 is used to provide instructions for the formatting of signaling messages from the call processor. It typically can be accessed by the routing table 1420 or the trunk group table 1406 and typically determines the format of the outgoing messages leaving the call processor.

The day of year table 1426 contains information that allows calls to be routed differently based on the day of the year. The day of year table typically points to the routing table 1420 and references the time zone table 1432 for information. The day of year table 1426 also can point to the called number screening table 1416, the called number table 1418, the routing table 1420, the day of week table 1428, the time of day table 1430, and the treatment table (see FIG. 15).

The day of week table 1428 contains information that allows calls to be routed differently based on the day of the week. The day of week table typically points to the routing table 1420 and references the time zone table 1432 for information. The day of week table 1428 also can point to the called number screening table 1416, the called number table 1418, the time of day table 1430, and the treatment table (see FIG. 15).

The time of day table 1430 contains information that allows calls to be routed differently based on the time of the day. The time of day table 1430 typically points to the routing table 1420 and references the time zone table 1432 for information. The time of day table 1430 also can point to the called number screening table 1416, the called number table 1418, and the treatment table (see FIG. 15).

The time zone table 1432 contains information that allows call processing to determine if the time associated with the call processing should be offset based on the time zone or daylight savings time. The time zone table 1432 is referenced by, and provides information to, the day of year table 1426, the day of week table 1428, and the time of day table 1430.

Figure 15:
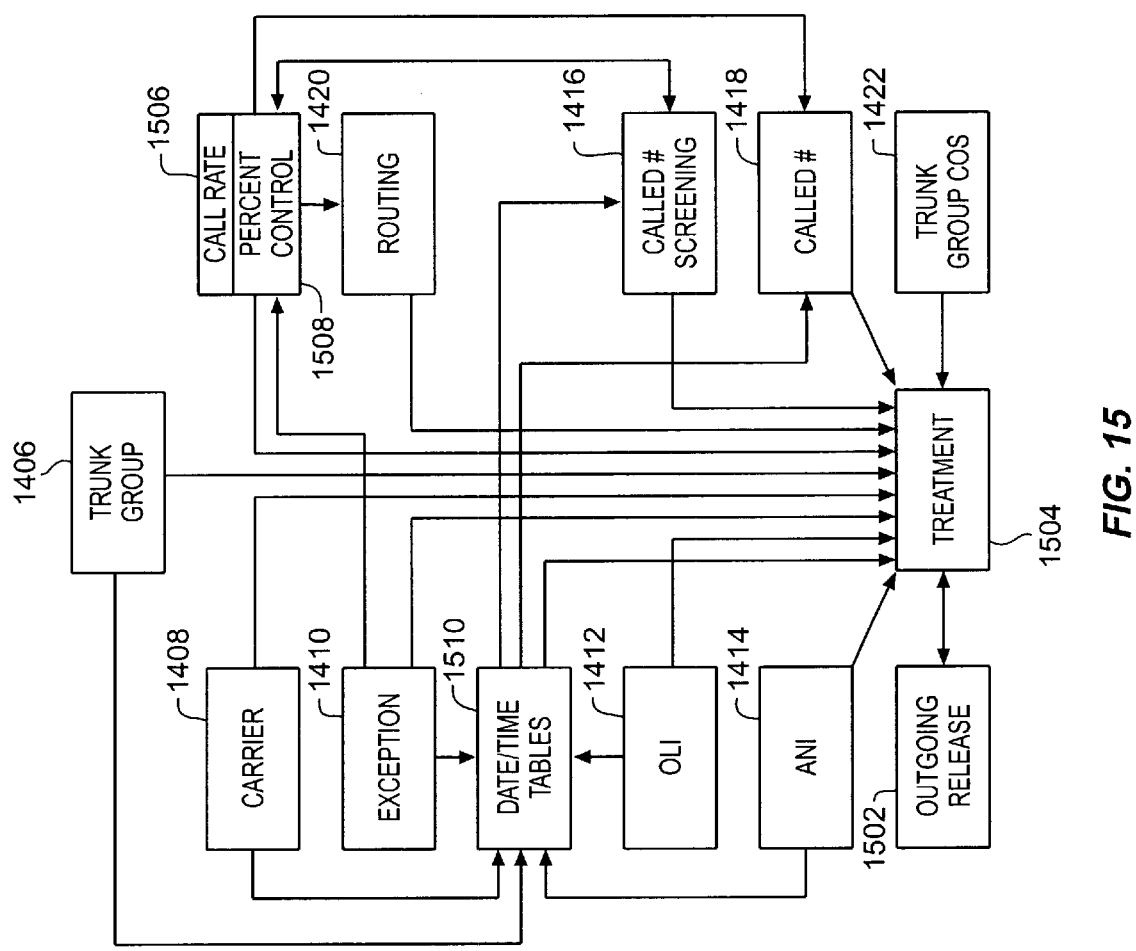
FIG. 15 is a block diagram of additional tables that are used in the signaling processor.

FIG. 15 is an overlay of FIG. 14. The tables from FIG. 14 are present. However, for clarity, the table's pointers have been omitted, and some tables have not been duplicated in FIG. 15. FIG. 15 illustrates additional tables that can be accessed from the tables of FIG. 14. These include an outgoing release table 1502, a treatment table 1504, a call rate table 1506, and a percent control table 1508, and time/date tables 1510.

The outgoing release table 1502 contains information that allows call processing to determine how an outgoing release message is to be formatted. The outgoing release table 1502 typically points to the treatment table 1506.

The treatment table 1504 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 1504 typically points to the outgoing release table 1502 and the database services table (see FIG. 16).

The call rate table 1506 contains information that is used to control call attempts on an attempt per second basis. Preferably, attempts from 100 per second to 1 per minute are programmable. The call rate table 1506 typically points to the called number screening table 1416, the called number table 1418, the routing table 1420, and the treatment table 1504.

The percent control table 1508 contains information that is used to control call attempts based upon a percent value of the traffic that is processed through call processing. The percent control table 1508 typically points to the called number screening table 1416, the called number table 1418, the routing table 1420, and the treatment table 1504.

The date/time tables 1510 have been identified in FIG. 14 as the day of year table 1426, the day of week table 1428, the time of day table 1426, and the time zone table 1432. They are illustrated in FIG. 15 as a single location for ease and clarity but need not be so located.

Figure 16:
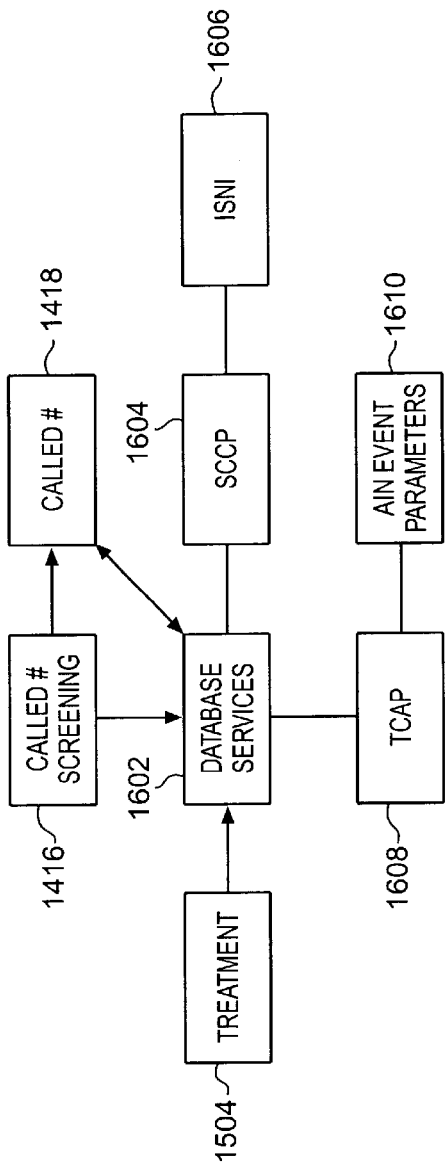
FIG. 16 is a block diagram of additional tables that are used in the signaling processor.

FIG. 16 is an overlay of FIGS. 14–15. The tables from FIGS. 14–15 are present. However, for clarity, the table's pointers have been omitted, and some tables have not been duplicated in FIG. 16.

FIG. 16 illustrates additional tables that can be accessed from the tables of FIGS. 14–15 and which are directed to the TCAP and the SCCP message processes. These include a database services table 1602, a signaling connection control part (SCCP) table 1604, an intermediate signaling network identification (ISNI) table 1606, a transaction capabilities application part (TCAP) table 1608, and an advanced intelligent network (AIN) event parameters table 1610.

The database services table 1602 contains information about the type of database service requested by call processing. The database services table 1602 references and obtains information from the SCCP table 1604 and the TCAP table 1608. After the database function is performed, the call is returned to normal call processing. The database services table 1602 points to the called number table 1418.

The SCCP table 1604 contains information and parameters required to build an SCCP message. The SCCP table 1604 is referenced by the database services table 1602 and provides information to the database services table.

The ISNI table 1606 contains network information that is used for routing SCCP message to a destination node. The ISNI table 1606 is referenced by the SCCP table 1604 and provides information to the SCCP table.

The TCAP table 1608 contains information and parameters required to build a TCAP message. The TCAP table 1608 is referenced by the database services table 1602 and provides information to the database services table.

The AIN event parameters table 1610 contains information and parameters that are included in the parameters portion of a TCAP event message. The AIN event parameters table 1610 is referenced by the TCAP table 1608 and provides information to the TCAP table.

Figure 17:
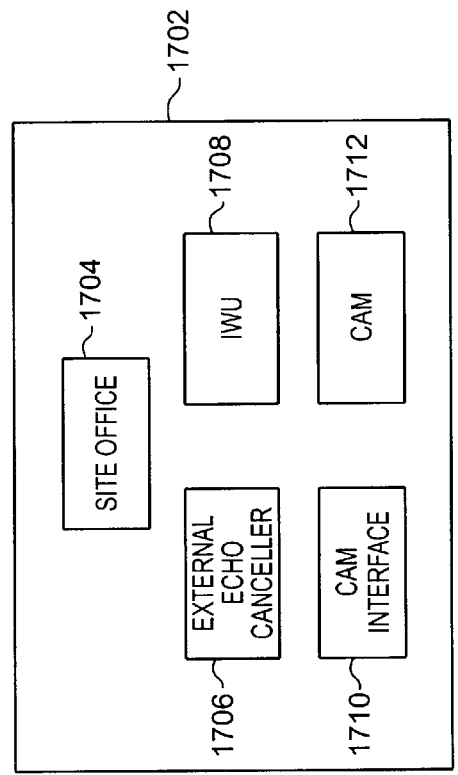
FIG. 17 is a block diagram of additional tables that are used in the signaling processor.

FIG. 17 is an overlay of FIGS. 14–16. The tables from FIGS. 14–16 are present. However, for clarity, the tables have not been duplicated in FIG. 17. FIG. 17 illustrates additional tables that can be used to setup the call process so that the tables of FIGS. 14–16 may be used. These setup tables 1702 include a site office table 1704, an external echo canceller table 1706, an interworking unit (IWU) table 1708, a controllable ATM matrix (CAM) interface table 1710, and a controllable ATM matrix (CAM) table 1712.

The site office table 1704 contains information which lists office-wide parameters, some of which are information-based and others which affect call processing. The site office table 1704 provides information to the call processor or switch during initialization or other setup procedures, such as population of data or transfer of information to one or more memory locations for use during call processing.

The external echo canceller 1706 contains information that provides the interface identifier and the echo canceller type when an external echo canceller is required. The external echo canceller table 1706 provides information to the call processor or switch during initialization or other setup procedures, such as population of data or transfer of information to one or more memory locations for use during call processing.

The IWU table 1708 contains the internet protocol (IP) identification numbers for interfaces to the interworking units at the call processor or switch site. The IWU table 1708 provides information to the call processor or switch during initialization or other setup procedures, such as population of data or transfer of information to one or more memory locations for use during call processing.

The CAM interface table 1710 contains information for the logical interfaces associated with the CAM. The CAM interface table 1710 provides information to the call processor or switch during initialization or other setup procedures, such as population of data or transfer of information to one or more memory locations for use during call processing.

The CAM table 1712 contains information associated with the logical and physical setup properties of the CAM. The CAM table 1712 provides information to the call processor or switch during initialization or other setup procedures, such as population of data or transfer of information to one or more memory locations for use during call processing.

FIGS. 23–52 depict examples of the various tables described above. It will be appreciated that other versions of tables may be used. In addition, information from the identified tables may be combined or changed to form different tables.

FIG. 18 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 19 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 20A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP TIP is not received in an IAM, the default JIP is a value recorded on the call processor ECDB. If an incoming IAM does not have a JIP, call processing will populate the JIP of the outgoing IAM with the default value from the trunk group table. If a JIP is not data filled, an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 20B is a continuation of FIG. 20A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 20C is a continuation of FIG. 20B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 21 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 22 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 23 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 24 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 1406.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may transmit a call to a specific recording based on a dialed number. The next function and next label point to the next table and an area within that table for further call processing.

FIG. 25 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 26 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 27 depicts an example of a day of year table. The day of year label is used as a key to enter the table. The date field indicates the local date which is applicable to the action to be taken during the processing of this table. The next function and next label identify the table and the area within that table for further call processing.

FIG. 28 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 29 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 30 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 31 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 32 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, transmit the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 33 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 34 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 35 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 36 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 37 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 38A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 38B is a continuation of FIG. 38A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 38C is a continuation of FIG. 38B for the SCCP table. FIG. 38C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 38D is a continuation of FIG. 38C for the SCCP table. FIG. 38D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 39 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 40 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 41 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 42 depicts an example of an interworking unit interface table. The interworking unit (IWU) is a key that is used to enter the table. The IWU identification (ID) identifies which interworking unit is being addressed. The internet protocol (IP) sockets 1–4 specify the IP socket address of any of the four connections to the interworking unit.

FIG. 43 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 44 depicts an example of a controllable ATM matrix (CAM) table. The CAM label is used as a key to enter the table. The CAM type indicates the type of CAM control protocol. The CAM address identifies the address of the CAM.

FIG. 45A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 45B is a continuation of FIG. 45A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 45C is a continuation of FIG. 45B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 45D is a continuation of FIG. 45C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 46A–46B depict an example of an advanced intelligent network (AIN) event parameters table. The AIN event parameters table has two columns. The first identifies the parameters that will be included in the parameters portion of the TCAP event message. The second entry may include information for analysis.

FIG. 47 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method for providing an absolute address for a call center resource, the method comprising:

receiving an address query for the absolute address into a call center resource processor from a communications system;

in the call center resource processor, processing the address query to identify the absolute address for the call center resource;

in the call center resource processor, generating an address response with the absolute address for the call center resource; and transmitting the address response with the absolute address from the call center resource processor for the communications system.

2. The method of claim 1 wherein processing the address query to identify the absolute address for the call center resource comprises processing a caller number in the address query to identify the absolute address.

3. The method of claim 1 wherein processing the address query to identify the absolute address for the call center resource comprises processing a time of day to identify the absolute address.

4. The method of claim 1 wherein processing the address query to identify the absolute address for the call center resource comprises processing a day of the week to identify the absolute address.

5. The method of claim 1 wherein processing the address query to identify the absolute address for the call center resource comprises processing a day of the year to identify the absolute address.

6. The method of claim 1 wherein processing the address query to identify the absolute address for the call center resource comprises processing a geographic region to identify the absolute address.

7. The method of claim 1 wherein processing the address query to identify the absolute address for the call center resource comprises processing a called number in the address query to identify the absolute address.

8. The method of claim 1 wherein processing the address query to identify the absolute address for the call center resource comprises processing a distance between the call center resource and a caller to identify the absolute address.

9. The method of claim 1 wherein processing the address query to identify the absolute address for the call center resource comprises processing a percentage allocation of call center resources to calls to identify the absolute address.

10. The method of claim 1 wherein processing the address query to identify the absolute address for the call center resource comprises processing a load balancing of call center resources to identify the absolute address.

11. The method of claim 1 wherein processing the address query to identify the absolute address for the call center resource comprises processing call quotas of call center resources to identify the absolute address.

12. The method of claim 1 wherein processing the address query to identify the absolute address for the call center resource is based upon caller entered digits.

13. The method of claim 1 further comprising in the call center resource processor, generating service data for the call center resource.

14. The method of claim 1 wherein processing the address query to identify the absolute address for the call center resource further processing an availability indication and capability data in a call center database for the call center resource.

15. The method of claim 14 wherein the availability indication reflects that the absolute address for the call center resource can be used to handle calls.

16. The method of claim 14 wherein the capability data for the call center resource indicate the language capabilities of the call center resource.

17. The method of claim 14 wherein the capability data for the call center resource indicate a gender of a call center resource agent.

18. The method of claim 14 wherein the capability data for the call center resource indicate age groups of call center resource agents.

19. The method of claim 14 wherein the capability data for the call center resource indicate education of call center resource agents.

20. The method of claim 14 wherein the capability data for the call center resource indicate income levels of call center resource agents.

21. The method of claim 14 wherein the capability data for the call center resource indicate seniority level of call center resource agents.

22. The method of claim 14 wherein the capability data for the call center resource indicate skill level of call center resource agents.

23. The method of claim 14 wherein the capability data for the call center resource indicate call center resource agents' knowledge of a subject.

24. The method of claim 14 wherein the capability data for the call center resource indicate industry experience of call center resource agents.

25. The method of claim 1 further comprising routing calls to voice response device or call center resource agents.

26. The method of claim 1 further comprising playing pre-recorded messages.

27. The method of claim 1 further comprising capturing caller entered digits.

28. The method of claim 27 further comprising validating the caller entered digits.

29. The method of claim 1 further comprising:
receiving service data into a call center report processor;
receiving call information into the call center report processor; and
storing the service data and call information in the call center report processor.

30. A method for updating a call center database with information related to a call center resource, the method comprising:
obtaining an availability indication for the call center resource;
obtaining capability data for the call center resource;
obtaining an association of an absolute address with the call center resource; and
transferring information to the database associating the absolute address for the call center resource with the availability indication and the capability data for the call center resource.

31. The method of claim 30 wherein the availability indication reflects that the absolute address for the call center resource can be used to handle calls.

32. The method of claim 31 further comprising obtaining an unavailability indication for the call center resource and updating the database to reflect that the absolute address for the call center resource cannot be used to handle calls.

33. The method of claim 32 further comprising obtaining another availability indication for the call center resource and updating the database to reflect that the absolute address for the call center resource can be used to handle calls.

34. The method of claim 30 wherein the capability data for the call center resource indicate the language capabilities of the call center resource.

35. The method of claim 30 wherein the capability data for the call center resource indicate a gender of a call center resource agent.

36. The method of claim 30 wherein the capability data for the call center resource indicate age groups of call center resource agents.

37. The method of claim 30 wherein the capability data for the call center resource indicate education of call center resource agents.

38. The method of claim 30 wherein the capability data for the call center resource indicate income levels of call center resource agents.

39. The method of claim 30 wherein the capability data for the call center resource indicate seniority level of call center resource agents.

40. The method of claim 30 wherein the capability data for the call center resource indicate skill level of call center resource agents.

41. The method of claim 30 wherein the capability data for the call center resource indicate call center resource agents' knowledge of a subject.

42. The method of claim 30 wherein the capability data for the call center resource indicate industry experience of call center resource agents.

43. A software product comprising:
call center resource processor software operational when executed by a processor to direct the processor to receive an address query for the absolute address from a communications system, process the address query to identify the absolute address for the call center resource, generate an address response with the absolute address for the call center resource, and transmit the address response with the absolute address from the call center resource processor for the communications system; and
a software storage medium operational to store the call center resource processor software.

44. The software product of claim 43 wherein the call center resource processor software operational when executed by the processor to direct the processor to process the address query to identify the absolute address for the call center resource is further operational to process a caller number in the address query to identify the absolute address.

45. The software product of claim 43 wherein the call center resource processor software operational when executed by the processor to direct the processor to process the address query to identify the absolute address for the call center resource is further operational to process a time of day to identify the absolute address.

46. The software product of claim 43 wherein the call center resource processor software operational when executed by the processor to direct the processor to process the address query to identify the absolute address for the call center resource is further operational to process a day of the week to identify the absolute address.

47. The software product of claim 43 wherein the call center resource processor software operational when executed by the processor to direct the processor to process the address query to identify the absolute address for the call center resource is further operational to process a day of the year to identify the absolute address.

48. The software product of claim 43 wherein the call center resource processor software operational when executed by the processor to direct the processor to process the address query to identify the absolute address for the call center resource is further operational to process a geographic region to identify the absolute address.

49. The software product of claim 43 wherein the call center resource processor software operational when executed by the processor to direct the processor to process the address query to identify the absolute address for the call center resource is further operational to process a called number in the address query to identify the absolute address.

50. The software product of claim 43 wherein the call center resource processor software coperational when executed by the processor to direct the processor to process the address query to identify the absolute address for the call center resource is further operational to process a distance between the call center resource and a caller to identify the absolute address.

51. The software product of claim 43 wherein the call center resource processor software operational when executed by the processor to direct the processor to process the address query to identify the absolute address for the call center resource is further operational to process a percentage allocation of call center resources to calls to identify the absolute address.

52. The software product of claim 43 wherein the call center resource processor software operational when executed by the processor to direct the processor to process the address query to identify the absolute address for the call center resource is further operational to process a load balancing of call center resources to identify the absolute address.

53. The software product of claim 43 wherein the call center resource processor software operational when executed by the processor to direct the processor to process the address query to identify the absolute address for the call center resource is further operational to process call quotas of call center resources to identify the absolute address.

54. The software product of claim 43 wherein the call center resource processor software operational when executed by the processor to direct the processor to process the address query to identify the absolute address for the call center resource is further operational to process caller entered digits.

55. The software product of claim 43 wherein the call center resource processor software is further operational when executed by the processor to direct the processor to generate service data for the call center resource.

56. The software product of claim 43 wherein the call center resource processor software is further operational when executed by the processor to direct the processor to process an availability indication and capability data in a call center database for the call center resource.

57. The software product of claim 56 wherein the availability indication reflects that the absolute address for the call center resource can be used to handle calls.

58. The software product of claim 56 wherein the capability data for the call center resource indicate the language capabilities of the call center resource.

59. The software product of claim 56 wherein the capability data for the call center resource indicate a gender of a call center resource agent.

60. The software product of claim 56 wherein the capability data for the call center resource indicate age groups of call center resource agents.

61. The software product of claim 56 wherein the capability data for the call center resource indicate education of call center resource agents.

62. The software product of claim 56 wherein the capability data for the call center resource indicate income levels of call center resource agents.

63. The software product of claim 56 wherein the capability data for the call center resource indicate seniority level of call center resource agents.

64. The software product of claim 56 wherein the capability data for the call center resource indicate skill level of call center resource agents.

65. The software product of claim 56 wherein the capability data for the call center resource indicate call center resource agents' knowledge of a subject.

66. The software product of claim 56 wherein the capability data for the call center resource indicate industry experience of call center resource agents.

67. The software product of claim 43 wherein the call center resource processor software is further operational when executed by the processor to direct the processor to route calls to voice response device or call center resource agents.

68. The software product of claim 43 wherein the call center resource processor software is further operational when executed by the processor to direct the processor to play pre-recorded messages.

69. The software product of claim 43 wherein the call center resource processor software is further operational when executed by the processor to direct the processor to capture caller entered digits.

70. The software product of claim 43 wherein the call center resource processor software is further operational when executed by the processor to direct the processor to validate the caller entered digits.

71. The software product of claim 43 wherein the call center resource processor software is further operational when executed by the processor to direct the processor to:
   receive service data into a call center report processor;
   receive call information into the call center report processor; and
   store the service data and call information in the call center report processor.

72. A software product comprising:
   resource management software operational when executed by a processor to direct the processor to obtain an availability indication for a call center resource, obtain capability data for the call center resource, obtain an association of an absolute address with the call center resource, and transfer information to the database associating the absolute address for the call center resource with the availability indication and the capability data for the call center resource; and
   a software storage medium operational to store the resource management software.

73. The software product of claim 72 wherein the availability indication reflects that the absolute address for the call center resource can be used to handle calls.

74. The software product of claim 73 wherein the resource management software is further operational when executed by the processor to direct the processor to obtain an unavailability indication for the call center resource and update the database to reflect that the absolute address for the call center resource cannot be used to handle calls.

75. The software product of claim 74 wherein the resource management software is further operational when executed by the processor to direct the processor to obtain another availability indication for the call center resource and update the database to reflect that the absolute address for the call center resource can be used to handle calls.

76. The software product of claim 72 wherein the capability data for the call center resource indicate the language capabilities of the call center resource.

77. The software product of claim 72 wherein the capability data for the call center resource indicate a gender of a call center resource agent.

78. The software product of claim 72 wherein the capability data for the call center resource indicate age groups of call center resource agents.

79. The software product of claim 72 wherein the capability data for the call center resource indicate education of call center resource agents.

80. The software product of claim 72 wherein the capability data for the call center resource indicate income levels of call center resource agents.

81. The software product of claim 72 wherein the capability data for the call center resource indicate seniority level of call center resource agents.

82. The software product of claim 72 wherein the capability data for the call center resource indicate skill level of call center resource agents.

83. The software product of claim 72 wherein the capability data for the call center resource indicate call center resource agents' knowledge of a subject.

84. The software product of claim 72 wherein the capability data for the call center resource indicate industry experience of call center resource agents.

* * * * *